(12) United States Patent
Speidel et al.

(10) Patent No.: US 12,052,088 B2
(45) Date of Patent: *Jul. 30, 2024

(54) SIMPLIFIED INTER-SATELLITE LINK COMMUNICATIONS USING ORBITAL PLANE CROSSING TO OPTIMIZE INTER-SATELLITE DATA TRANSFERS

(71) Applicant: Lynk Global, Inc., Falls Church, VA (US)

(72) Inventors: Tyghe Robert Speidel, Washington, DC (US); Andrew J. Gerber, Darnestown, MD (US)

(73) Assignee: Lynk Global, Inc., Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,295

(22) Filed: Nov. 7, 2022

(65) Prior Publication Data
US 2023/0268989 A1    Aug. 24, 2023

Related U.S. Application Data

(63) Continuation of application No. 16/920,319, filed on Jul. 2, 2020, now Pat. No. 11,522,604, which is a (Continued)

(51) Int. Cl.
*H04B 7/185* (2006.01)
*H04B 7/195* (2006.01)

(52) U.S. Cl.
CPC ..... *H04B 7/18521* (2013.01); *H04B 7/18515* (2013.01); *H04B 7/18532* (2013.01); *H04B 7/195* (2013.01)

(58) Field of Classification Search
CPC ............ H04B 7/18521; H04B 7/18515; H04B 7/18532; H04B 7/195
See application file for complete search history.

(56) References Cited

U.S. PATENT DOCUMENTS 3,349,398 A   10/1967  Werth
5,467,345 A   11/1995  Cutler, Jr. et al.
(Continued)

FOREIGN PATENT DOCUMENTS

EP    2999136 A1   3/2016
WO    2006038992 A1   4/2006
(Continued)

OTHER PUBLICATIONS

"Adaptation of the IEEE 802.11 Protocol for Inter-Satellite Link in LEO Satellite Networks"; Sidibeh; Doctoral Thesis; Apr. 2008 (Year: 2008).*

(Continued)

*Primary Examiner* — Benjamin H Elliott, IV
(74) *Attorney, Agent, or Firm* — Haynes and Boone, LLP

(57) ABSTRACT

In a method and apparatus for inter-satellite communications, transmissions between a satellite and neighboring satellites that share an orbital plane occur via an aft antenna or a forward antenna and transmissions between the satellite and neighboring satellites that do not share an orbital plane occur via the aft antenna or the forward antenna timed during orbital plane crossings. This occurs even if the total path length and number of links is higher than inter-satellite communications that use side-to-side transfers.

17 Claims, 22 Drawing Sheets

Related U.S. Application Data continuation of application No. 15/910,959, filed on Mar. 2, 2018, now Pat. No. 10,742,311.

(60) Provisional application No. 62/465,945, filed on Mar. 2, 2017.

(56) References Cited

U.S. PATENT DOCUMENTS

| | | | |
|---|---|---|---|
| 5,642,355 A | 6/1997 | Smith | |
| 5,740,164 A | 4/1998 | Liron | |
| 5,943,324 A | 8/1999 | Ramesh et al. | |
| 5,978,653 A | 11/1999 | Taylor et al. | |
| 5,991,598 A | 11/1999 | Nawata | |
| 6,008,758 A | 12/1999 | Campbell | |
| 6,031,826 A | 2/2000 | Hassan | |
| 6,101,177 A | 8/2000 | Bodin et al. | |
| 6,157,621 A * | 12/2000 | Brown | H01Q 25/008 370/310 |
| 6,404,769 B1 | 6/2002 | Kapoor | |
| 7,257,371 B1 | 8/2007 | Bettinger et al. | |
| 7,502,382 B1 * | 3/2009 | Liu | H04B 7/18584 455/12.1 |
| 7,515,566 B2 | 4/2009 | Dale et al. | |
| 8,538,327 B2 | 9/2013 | Sayeed et al. | |
| 9,042,408 B2 | 5/2015 | Gaal et al. | |
| 9,184,829 B2 | 11/2015 | Miller et al. | |
| 9,628,956 B1 | 4/2017 | Kim | |
| 9,788,306 B2 | 10/2017 | Chen et al. | |
| 9,954,601 B2 | 4/2018 | Buer et al. | |
| 9,973,266 B1 | 5/2018 | Avellan et al. | |
| 10,084,535 B1 * | 9/2018 | Speidel | H04B 7/18532 |
| 10,742,311 B2 * | 8/2020 | Speidel | H04B 7/18515 |
| 11,522,604 B2 * | 12/2022 | Speidel | H04B 7/18521 |
| 2002/0060995 A1 | 5/2002 | Cervello et al. | |
| 2002/0151273 A1 * | 10/2002 | Marko | H04B 7/195 455/12.1 |
| 2002/0164986 A1 | 11/2002 | Briand et al. | |
| 2002/0177403 A1 | 11/2002 | LaPadre et al. | |
| 2003/0028339 A1 | 2/2003 | Caso et al. | |
| 2004/0192197 A1 * | 9/2004 | Capots | H04B 7/195 455/445 |
| 2005/0143005 A1 * | 6/2005 | Moore, III | H04B 7/18521 455/454 |
| 2006/0246913 A1 | 11/2006 | Merboth et al. | |
| 2007/0078541 A1 | 4/2007 | Rogers | |
| 2007/0184778 A1 * | 8/2007 | Mechaley, Jr. | H04B 7/2125 455/12.1 |
| 2010/0220780 A1 | 9/2010 | Peng et al. | |
| 2011/0135043 A1 | 6/2011 | Downey et al. | |
| 2012/0302160 A1 * | 11/2012 | Silny | H04B 7/18508 455/12.1 |
| 2016/0037434 A1 * | 2/2016 | Gopal | H04B 7/1851 370/316 |
| 2016/0080072 A1 * | 3/2016 | Baudoin | H04W 40/14 370/219 |
| 2017/0195040 A1 * | 7/2017 | Sobhani | H04B 7/18521 |
| 2017/0324465 A1 * | 11/2017 | Sotom | H04B 10/40 |
| 2018/0020205 A1 | 1/2018 | Aflalo et al. | |
| 2018/0020778 A1 | 1/2018 | Elder et al. | |
| 2018/0022474 A1 * | 1/2018 | Meek | B64G 1/1007 244/158.4 |
| 2018/0034538 A1 * | 2/2018 | Baudoin | H04W 40/023 |
| 2018/0069651 A1 | 3/2018 | Davydov et al. | |
| 2018/0138968 A1 | 5/2018 | Auer | |
| 2018/0254824 A1 * | 9/2018 | Speidel | H04B 7/18515 |
| 2018/0254825 A1 * | 9/2018 | Speidel | H04B 7/2123 |
| 2022/0021446 A1 * | 1/2022 | Speidel | H04B 7/18532 |
| 2023/0268989 A1 * | 8/2023 | Speidel | H04B 7/18521 370/316 |

FOREIGN PATENT DOCUMENTS

| | | |
|---|---|---|
| WO | 2016195813 A2 | 12/2016 |
| WO | 2016209332 A2 | 12/2016 |
| WO | 2017072745 A1 | 5/2017 |
| WO | 2017124004 A1 | 7/2017 |

OTHER PUBLICATIONS

International Search Report and Written Opinion Mailed Nov. 19, 2018, International Patent Application PCT/US2018/020778, Filed Mar. 2, 2018.

"Survey of Inter-Satellite Communication for Small Satelite Systems: Physical Layer to Network Layer View"; Radharkrishnan et al.; IEEE Communications Surveys & Tutorials, vol. 18, No. 4, Fourth Quarter 2016.

"Low Earth Orbit Satellite Payload for Personal Communications"; Coulomb et al.; 3rd European Conference on Satellite Communications—ECSC-3, 1993.

Eylem Ekici et al., "A Multicast Routing Algorithm for LEO Satellite IP Networks"; IEEE/ACM Transactions on Networking, IEEE/ACM, New York, NY, US, vol. 10, No. 2, Apr. 1, 2022.

Supplementary European Search Report Mailed Nov. 4, 2020, European Application No. 18810437.6 Filed Mar. 2, 2018, 2 Pages.

* cited by examiner v = velocity vector in orbital plane, tangent to orbit r = radial vector, also in orbital plane, pointing to center of Earth h = angular momentum vector, cross product of velocity and radial vectors

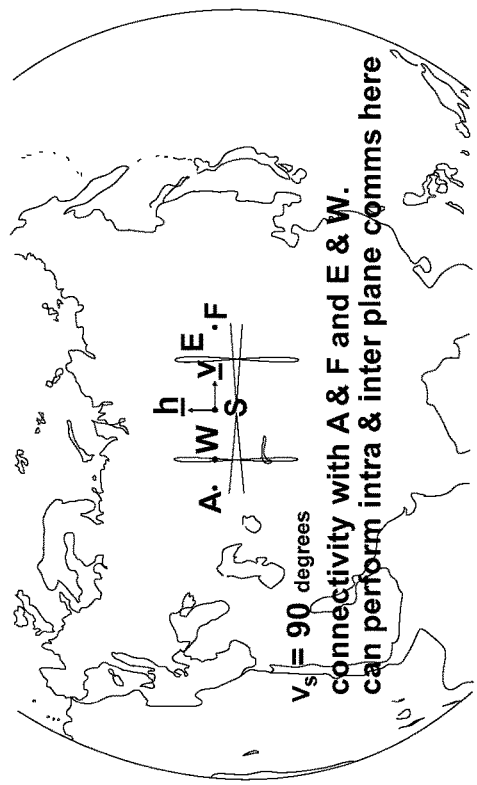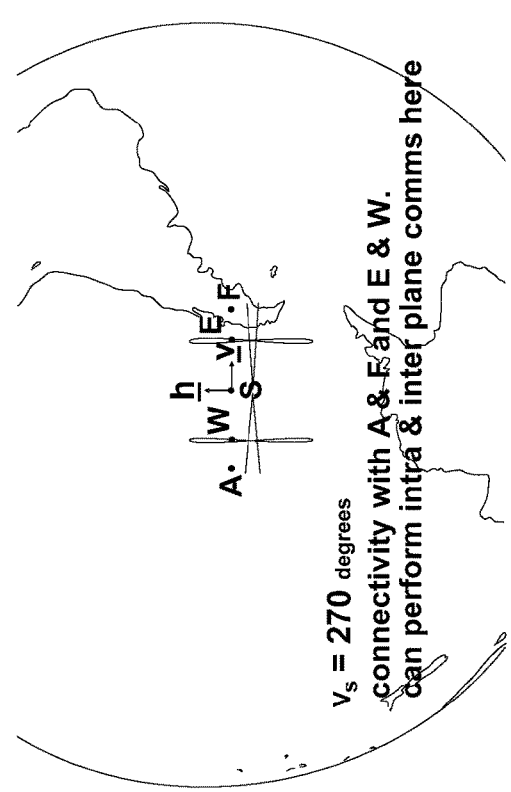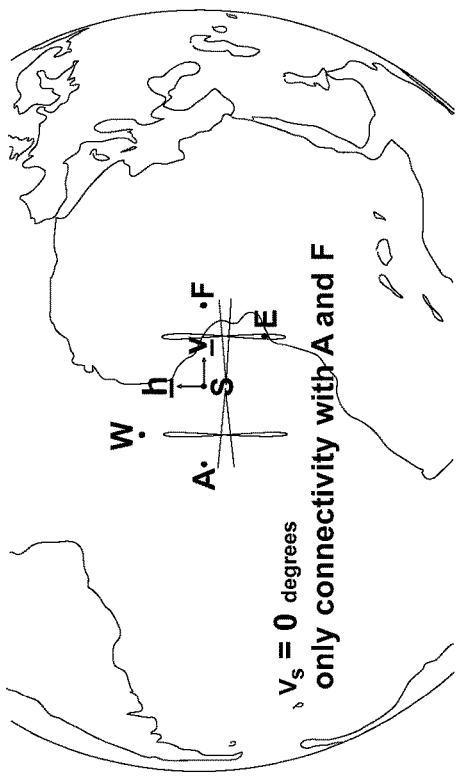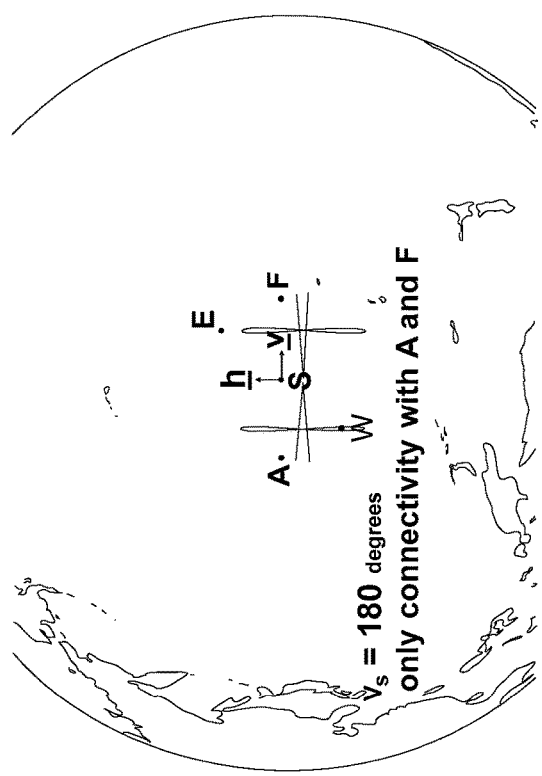
FIG. 16A
FIG. 16B
FIG. 16C
FIG. 16D

SIMPLIFIED INTER-SATELLITE LINK COMMUNICATIONS USING ORBITAL PLANE CROSSING TO OPTIMIZE INTER-SATELLITE DATA TRANSFERS

CROSS-REFERENCES TO PRIORITY AND RELATED APPLICATIONS

This application claims priority from and is a continuation of U.S. application Ser. No. 16/920,319 filed Jul. 2, 2020 entitled "Simplified Inter-Satellite Link Communications Using Orbital Plane Crossing to Optimize Inter-Satellite Data Transfers", which claims priority from and is a continuation of U.S. patent application Ser. No. 15/910,959 filed Mar. 2, 2018, now U.S. Pat. No. 10,742,311, entitled "Simplified Inter-Satellite Link Communications Using Orbital Plane Crossing to Optimize Inter-Satellite Data Transfers", which claims priority from and is a non-provisional of U.S. Provisional Patent Application No. 62/465,945 filed Mar. 2, 2017 entitled "Method for Low-Cost and Low-Complexity Inter-Satellite Link Communications within a Satellite Constellation Network for Near Real-Time, Continuous, and Global Connectivity". The entire disclosures of those applications are hereby incorporated by reference, as if set forth in full in this document, for all purposes.

This application also incorporates by reference U.S. patent application Ser. No. 15/857,073 filed Dec. 28, 2017 entitled "Method and Apparatus for Handling Communications Between Spacecraft Operating in an Orbital Environment and Terrestrial Telecommunications Devices that Use Terrestrial Base Station Communications" as if set forth in full in this document, for all purposes.

FIELD OF THE INVENTION

The present disclosure generally relates to inter-satellite communications among satellites in orbit. The disclosure relates more particularly to apparatus and techniques for performing multi-link transfers of data over multiple satellites, some of which might be in disparate orbital planes.

BACKGROUND

Communications that use satellites provide advantages not available to solely ground-based communications, but might also be subject to more constraints than ground-based communications. For example, satellites must remain in orbit a certain distance above the surface of the Earth, one satellite cannot cover the Earth's entire surface at one time, and other than geosynchronous satellites, the satellites move relative to the Earth's surface. As a result, it is often required to use a constellation of satellites and, where one ground-based user device needs to communicate with another one ground-based user device but they are not both within a footprint of one satellite, inter-satellite communications might be required. A geostationary satellite might have a footprint that is large enough so that the Earth's entire surface can be covered by four satellite footprints, but with low Earth orbit (LEO) satellites, the footprints might be approximately circular with diameters of around 1,000 km. In that case, it might require a constellation of around 1,000 to 2,000 satellites in order to have footprints that cover the Earth's entire surface in distinct orbital planes continuously. Even with geostationary satellites, which orbit approximately in a plane that includes the Earth's equator, full coverage is not simple, as the poles are not well covered by geostationary satellites and constellations using distinct orbital planes might be needed, such as a constellation of geostationary satellites and polar satellites.

If the source device and the destination device are both within one satellite's footprint, the source device can send data to the satellite by transmitting a signal that is received by the satellite and the satellite can send the data to the destination device by transmitting a signal that is received by the destination device. More is needed if the source device and destination device are not both within a footprint of one satellite. In that case, the data has to get from one footprint to another footprint. More specifically, the link path from the source device to the destination device is more than just the path from the source device to the satellite to the destination device.

In some approaches, a constellation comprises a plurality of orbital planes and routing of data communications satellite is done on a grid-like basis, where data is transmitted from one satellite to another one that is forward of the transmitter (referred to as north, even though it might not be the same direction as North on the Earth's surface below the transmitter), one that is aft (south) of the transmitter, to one side (west) or the other (east) of the transmitter. While the aft and forward receivers might be in a stable orientation relative to the transmitter, the east and west satellites are in different orbital planes, so their orientation relative to the transmitter varies. This might require wideband antennas that can be inefficient, costly and add to link budgets, weight budgets, and power budgets.

Satellite communications systems are often needed to provide global, or near-global, coverage of the planet such that individuals and businesses can remain connected and receive/send information (i.e., phone calls, messages, data, etc.) at any time in near real-time or otherwise.

Improved inter-satellite link communications might overcome some of the limitations described above.

SUMMARY

In a method and apparatus for inter-satellite communications, transmissions between a satellite and neighboring satellites that share an orbital plane occur via an aft antenna or a forward antenna and transmissions between the satellite and neighboring satellites that do not share an orbital plane occur via the aft antenna or the forward antenna timed during orbital plane crossings. This occurs even if the total path length and number of links is higher than inter-satellite communications that use side-to-side transfers.

A method of operating a communications system to transfer a message from a source device to a destination device might comprise obtaining, at a satellite, a message, obtaining, at the satellite, a message path for the message, wherein the message path accounts for orbital movements of the satellite and other satellites in a constellation, determining, at the satellite, based on the message path, a next satellite in the constellation selected from an aft satellite, a forward satellite, a west-crossing cross-plane satellite, or an east-crossing cross-plane satellite, and sending, from the satellite, the message to the next satellite, wherein the message path indicates the next satellite. The message path might be computed it on the satellite or a ground location, the method further comprising including a representation of the message path with the message.

The method might include passing the message from a downlink satellite to a ground station and passing the message from the ground station to an uplink satellite, if the message path includes the ground station. The message might be stored at the satellite for a predetermined period of time prior to sending the message to the next satellite. The predetermined period of time might be specified in a representation of the message path and/or determined from orbital parameters and corresponding to a passing of a cross-plane satellite in a beam path of the satellite and the satellite would use that representation of a predetermined period of time to time a message transmission.

In some variations, each satellite in the constellation has a distinct orbital plane and the constellation is arranged as a spiral.

The message path might explicitly be limited to only links for cross-plane satellites when an in-plane antenna can be used to convey the message.

A system for communicating messages from a source device to a destination device might comprise a processor for computing a message path for a message, a plurality of satellites in a constellation, wherein a satellite is configured to receive and send messages to other satellites in the constellation, storage for a message path for the message, wherein the message path accounts for orbital movements of the satellite and other satellites in a constellation, a first antenna for sending and receiving messages between the satellite and an aft in-plane satellite or an aft cross-plane satellite, a second antenna for sending and receiving messages between the satellite and a forward in-plane satellite or a forward cross-plane satellite, logic for determining, at the satellite, based on the message path, a next satellite in the constellation selected from an aft in-plane satellite, a forward in-plane satellite, an aft cross-plane satellite, or a forward cross-plane satellite, and a radio frequency transmission system for sending or receiving, to or from the satellite, the message from or to the next satellite, based on the message path.

The system might include one or more ground stations for repeating messages. The system might include a clock for use at least in timing storage of messages as indicated by representations of predetermined periods specified by the message path. A representation of the predetermined period of time might be specified in a representation of the message path and/or determined from orbital parameters and corresponding to a passing of a cross-plane satellite in a beam path of the satellite.

Message might comprise representation of SMS messages, data packets, or at least portion of digitized audio signals, such as voice signals.

In some aspects, a satellite is described that is for use in a constellation of satellites capable of inter-satellite message forwarding and having orbital planes and comprises a processor, memory storage for a message, memory storage for a representation of at least a portion of a message path, wherein the message path indicates a plurality of satellites in the constellation through which the message is to be forwarded, wherein at least two of the plurality of satellites indicated in the message path are in distinct orbital planes and thus are cross-plane satellites relative to each other, an aft antenna for sending and receiving messages between the satellite and an aft in-plane satellite or an aft cross-plane satellite, a forward antenna for sending and receiving messages between the satellite and a forward in-plane satellite or a forward cross-plane satellite, a radio frequency transmission system for receiving the message and for sending, from the satellite, the message to a next satellite, via the aft antenna or the forward antenna, and program code stored in a program code memory accessible by the processor.

The program code might be executable by the processor and comprise a) program code for initiating the reception of the message, b) program code for initiating the sending of the message, c) program code for computing, obtaining, or extracting the representation of at least a portion of the message path, wherein computation of the representation of at least a portion of the message path accounts for orbital movements of the satellite and other satellites in the constellation, and d) program code for determining, at the satellite, based on the message path, which of the satellites in the constellation is to be the next satellite, selected from the aft in-plane satellite, the forward in-plane satellite, the aft cross-plane satellite, or the forward cross-plane satellite, where the determination considers orbital plane crossings.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIGS. 16A-D illustrate the timing that results from the orbits shown in FIG. 15 and FIG. 9.

DETAILED DESCRIPTION

Figure 1:
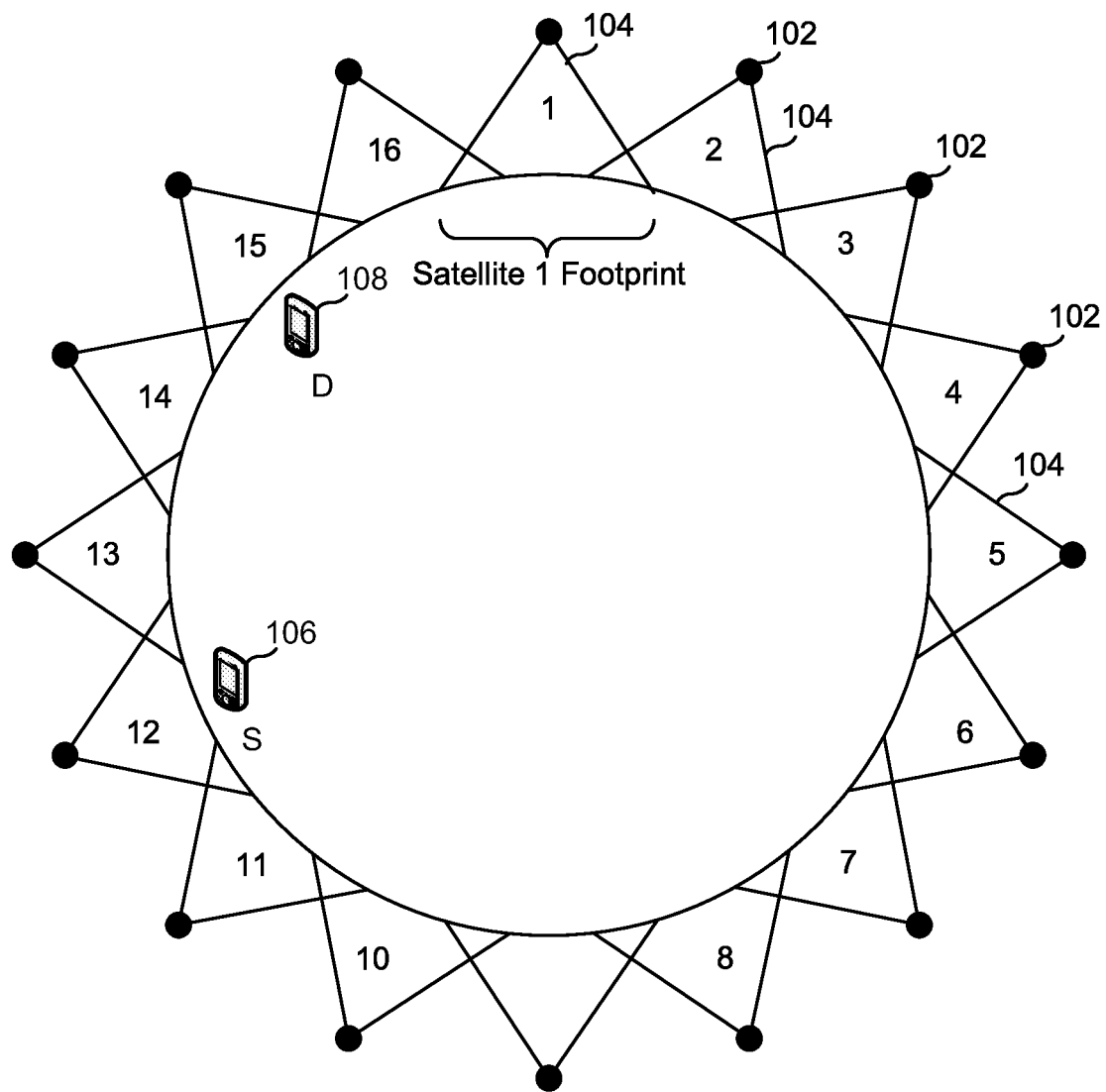
FIG. 1 illustrates a constellation of satellites in an orbital plane that might be used with aspects of the present invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include novel arrangements for inter-satellite communications and ground-to-satellite communications. In many examples herein, communication involves the transfer of data from one device to another device via one or more other devices or systems. In this disclosure, a path might be described using braces (e.g., "{ }") as for example {device 1, system A, system B, system C, device 2} referring to data being conveyed/communicated through several nodes and links between nodes from device 1 to device 2 by device 1 sending the data to system A (the first link), then system A sending the data to system B (the second link), then system B sending the data to system C (the third link), and then system C sending the data to device 2 (the fourth link), possibly with some local storage and/or delay, with or without protocol and/or formatting changes. The devices and/or systems might be fixed, portable or mobile, but generally in most examples herein, at least one node being in orbit.

Mobile communication involves signals being sent between a mobile station (MS) and a transceiver that can provide an interface for the MS to communicate to and from other network resources, such as telecommunication networks, the Internet, and the like, to carry voice and data communications, possibly also location-finding features, perhaps for ultimate communication between two mobile stations. Examples of mobile stations include mobile phones, cellular phones, smartphones, and other devices equipped to communicate wirelessly. While herein the mobile stations are referred to by that name, it should be understood that an operation, function or characteristic of a mobile station might also be that of a station that is effectively or functionally a mobile station, but is not at present mobile. In some examples, the mobile station might be considered instead a portable station that can be moved from place to place but in operation is stationary, such as a laptop computer with several connected peripherals and having a cellular connection, or the mobile station might be stationary, such as a cellular device that is embedded in a mounted home security system. All that is required is that the mobile station be able to, or be configured to, communicate wirelessly in at least one mode.

For simplicity of explanation, in many examples herein, communications is described as being between a first device and a second device, but it should be understood that the interactions might be from the first device to a radio circuit of the first device or one attached thereto, to an antenna of the first device, each implemented in hardware, firmware, and/or software, and a corresponding path at the second device end. In some variations, there are more than one first device and/or more than one second device, so the examples here might be extended to broadcast modes.

A device might use GSM (Global System for Mobile Communications; trademarked by the GSM Association) 2G+ protocols with Gaussian minimum-shift keying (GMSK), EDGE protocols with GMSK and 8-PSK keying, or the like. Where a spectrum band is logically divided into carrier frequency spectra, a device might use channels that use one (or more) of those carrier frequencies to communicate. Other variations of communications are possible.

Generally, as described herein, the communication path between the first device and the second device is {device 1, satellite constellation, device 2}, where at least one of the two devices is on the ground. Herein, "ground" refers to the surface, or a place near enough to the surface for communications purposes, of the Earth. The teachings herein with respect to Earth can be extended and applied to the surfaces of other celestial bodies at which electronic communications occurs.

Communications refers to conveying a signal by propagating electromagnetic energy, for example in a frequency range for antenna-to-antenna transfer of a signal, optical transmission, etc., where the signal conveys or transfers data from a source device to a destination device. As used herein, "data" can represent binary data, voice, images, video or other forms of data, possibly comprising information and redundant data for error detection and correction. The source device and/or the destination device might be a mobile device (designed to be easily carried and used when in motion), a portable device (designed to be easily moved, but generally used when stationary), or a stationary device that is used where it is installed. The size of source devices and/or the destination devices might range from smartphones to buildings with antennas attached or otherwise connected to electronics in or around the buildings. In the examples herein, at least one satellite (i.e., a man-made object that is in an orbit around a celestial body capable of electronic communication) is in the path from the source device to the destination device.

A "message" as used herein, can be represented by a data structure that is communicated from a source device or system to a destination device or system. In some cases, a message's source and destination are ground-based, such as a mobile device or a communications gateway to other terrestrial destinations. In other cases, the message is a control message that is a message to a satellite or from a satellite. The data structure represents the data that is to be conveyed. In one example, the message comprises a sequence of 160 characters, as with an SMS message. Some communications might comprise multiple messages intended to be reintegrated, such as packet-based communications. In some terminology, a message having more than one source and/or more than one destination might be considered to be a plurality of messages, each with one source and one destination.

A satellite operates in an orbit, which is a path in space of a satellite around a celestial body that is determinable, at least approximately, from an initial position and velocity of the satellite and from propulsion or other forces applied to, or impinging on, the satellite and that can be maintained, at least approximately and for a period of time, with a balance between gravitational attraction of the celestial body and tangential movement of the satellite along the path of the orbit. Orbits might be specified by a small number of parameters, such as the set of Keplerian elements: inclination (i), longitude of the ascending node (Ω), argument of periapsis (ω), eccentricity (e), semimajor axis (a), and t anomaly at epoch ($M_0$). Generally, orbits can be considered to be planar and a satellite not under propulsion or affected by other forces other than gravity can be considered to orbit in a plane with a predictable path, orbital period, etc. Satellites might be equipped with rockets or other propulsion means to allow the satellites to maintain their position in their orbits in their orbital planes.

Where an orbit of a satellite defines a curve in space that is a planar curve, an orbital plane is the plane, in some reference frame, in which the satellite travels. In some cases, the orbital plane may drift slightly and the satellite might vary slightly from its path and still be considered to be travelling in an orbital plane. In Earth orbits, an orbital plane might correspond to a great circle, and might be completely determined from two parameters, the inclination and the longitude of satellites that orbit in that orbital plane.

Examples of orbits include Low Earth Orbit (LEO) where a satellite travelling at 7.45 to 7.61 km/sec relative to Earth's surface follows an elliptical path about 500 to 700 km above the Earth's surface, Medium Earth Orbit (MEO) where a satellite travelling at 5.78 to 6.33 km/sec relative to Earth's surface follows an elliptical path about 4,000 to 5,000 km above the Earth's surface, or a geosynchronous orbit where a satellite travelling at around 3.1 km/sec relative to Earth's surface follows an elliptical path about 35,800 km above the Earth's surface.

At a particular time and/or orbital location, there is a region on the surface in which mobile devices or other devices or systems can communicate with a satellite if they are within a certain range of the satellite (and perhaps within line of sight, as needed) and other requirements are met. The area on the ground in which such devices are present is referred to as the satellite's "footprint." The definition need not be exact, and there might be situations where, for the same ground position, satellite position and other factors, the ground device is in the footprint in some cases and outside the footprint in other cases. There might also be different levels of footprint, such as where higher speed data communications can be had when the satellite is directly overhead, lower speed data communications when the satellite is at a lower angle relative to a surface plane, and no communications when the satellite is below the horizon, in which case there would be a "high-speed footprint" and a "low-speed footprint" where the latter is presumably larger than the former. A satellite's footprint is said to cover an area or a device if the satellite is in a position where direct communication between a ground-based device and the satellite is possible.

A set of two or more satellites that are in orbit and positioned to provide greater communication range compared to a single satellite is often referred to as a constellation. The relative positions, and positions over time, as well as the velocities, of the individual satellites in a constellation might be done according to a constellation coverage plan that provides a greater constellation footprint than can be provided by one satellite. For example, if coverage is needed for continuous communications at latitudes between 20 degrees North to 20 degrees South with ground devices having fixed directional antennas, the constellation coverage plan might call for a constellation of six geosynchronous satellites. One example of a constellation that is used herein for the purposes of explanation is the Walker Delta Pattern constellation. Upon reading this disclosure, it should be apparent how examples referring to one constellation can be implemented in similar constellations. Constellations might be optimized for imaging, communications, prospecting, or other tasks and might be oriented in polar orbits, equatorial orbits, inclined orbits, low orbits, high orbits, eccentric orbits, etc.

FIG. 1 illustrates a constellation of sixteen satellites 102 (numbered 1 through 16) all in one orbital plane that might be used with aspects of the present invention. If each satellite has a footprint 104 with a diameter of more than 2500 km, a continuous constellation footprint would circle the Earth in a band. That band might be only 2500 km wide and less than that in many places. More complete coverage can be had using satellites in more than one orbital plane.

However, if the source device, S 106, and the destination device, D 108, are both within the constellation footprint, a communication path might be {device S, Sat 12, Sat 13, Sat 14, Sat 15, device D}. The satellite-to-satellite communications might be direct or might be via ground repeaters.

Satellite-based terrestrial communications might involve data transmissions from a source device on the ground to a satellite system in orbit that receives the data transmission, possibly processing the received data, and transmits the data to a destination device. The source device might not be the original source of the data and the destination device might not be the ultimate destination of the data, as there might be additional ground-based communications elements that come before the source device and/or after the destination device. The communications through the satellite system might comprise multiple links between satellites and/or ground repeaters, which are ground-based devices that receive data transmissions from one satellite and forward them to another satellite.

If is often useful to consider a reference frame of a satellite, such as when orienting a satellite, using directional antennas, navigating, etc. A reference frame is a coordinate space defined relative to a physical object or an aspect of the physical object in which the object or aspect is stationary (i.e., the coordinates of various points on the object or aspect do not materially change over a relevant time period), such as an Earth-centered reference frame in which the center of mass of the Earth is stationary in the Earth-centered reference frame's coordinate space and the angles between the Earth and distant stars are constant (while the surface of the Earth is, of course, not stationary in that reference frame), an Earth-surface reference frame in which the surface of the Earth is essentially stationary, or a satellite reference frame in which major structural elements of the satellite are stationary in the satellite reference frame's coordinate space.

Figure 2:
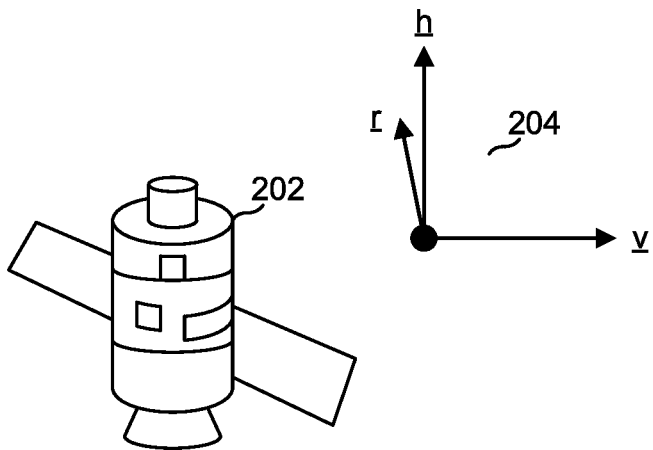
FIG. 2 illustrates a relevant reference frame for a satellite.

FIG. 2 illustrates a relevant reference frame 204 for a satellite 202. In this example, the reference frame 204 is defined by three orthogonal vectors: (1) v, the velocity vector of the satellite, which is in the orbital plane and tangent to the orbit, (2) r, the radial vector, also in orbital plane, pointing from the satellite to the center of the Earth, and (3) h, the angular momentum vector that is the cross product of the velocity vector and the radial vector and perpendicular to the orbital plane. With an origin at the satellite 202 and three orthogonal vectors, a coordinate system is defined by the reference frame 204.

In designing antennas for satellites, the reference frame is useful in determining antenna needs. In the reference frame of a satellite, other satellites in the same orbital plane in the same orbit, but advanced or delayed in time/position, will more or less appear stationary, while those in east/west orbits will appear to move in figure eights in the satellite's reference frame. Typically, for east/west orbits, this would require wide angle antennas or steerable antennas.

Figure 3:
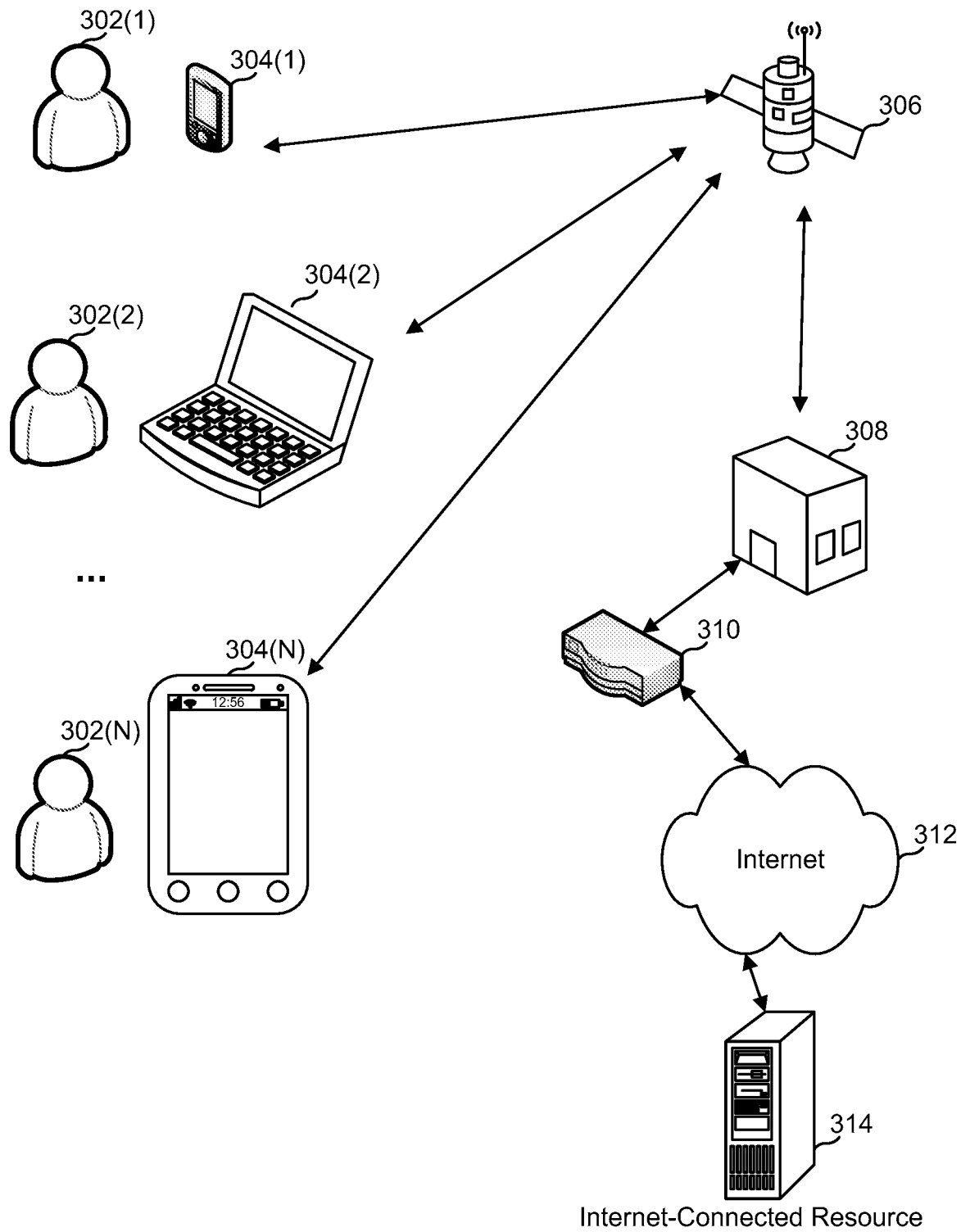
FIG. 3 illustrates examples of device-to-satellite communications as might be used with aspects of the present invention.

FIG. 3 illustrates examples of device-to-satellite communications as might be used with aspects of the present invention. As shown there, persons 302 have various devices 304 that include elements that constitute a mobile station, such as a smartphone 304(1), a laptop computer 304(2), and a tablet device 304(N), each of which are configured and/or adapted to communicate with a satellite 306 that in turn can communicate with a ground station 308 that might route data messages to a router 310 and from there to the Internet 312 and/or Internet-connected resources 314. Other examples of devices might be user interfaceless devices such as industrial, automotive, or home equipment that interacts over a network (e.g., "Internet of Things" devices).

Figure 4:
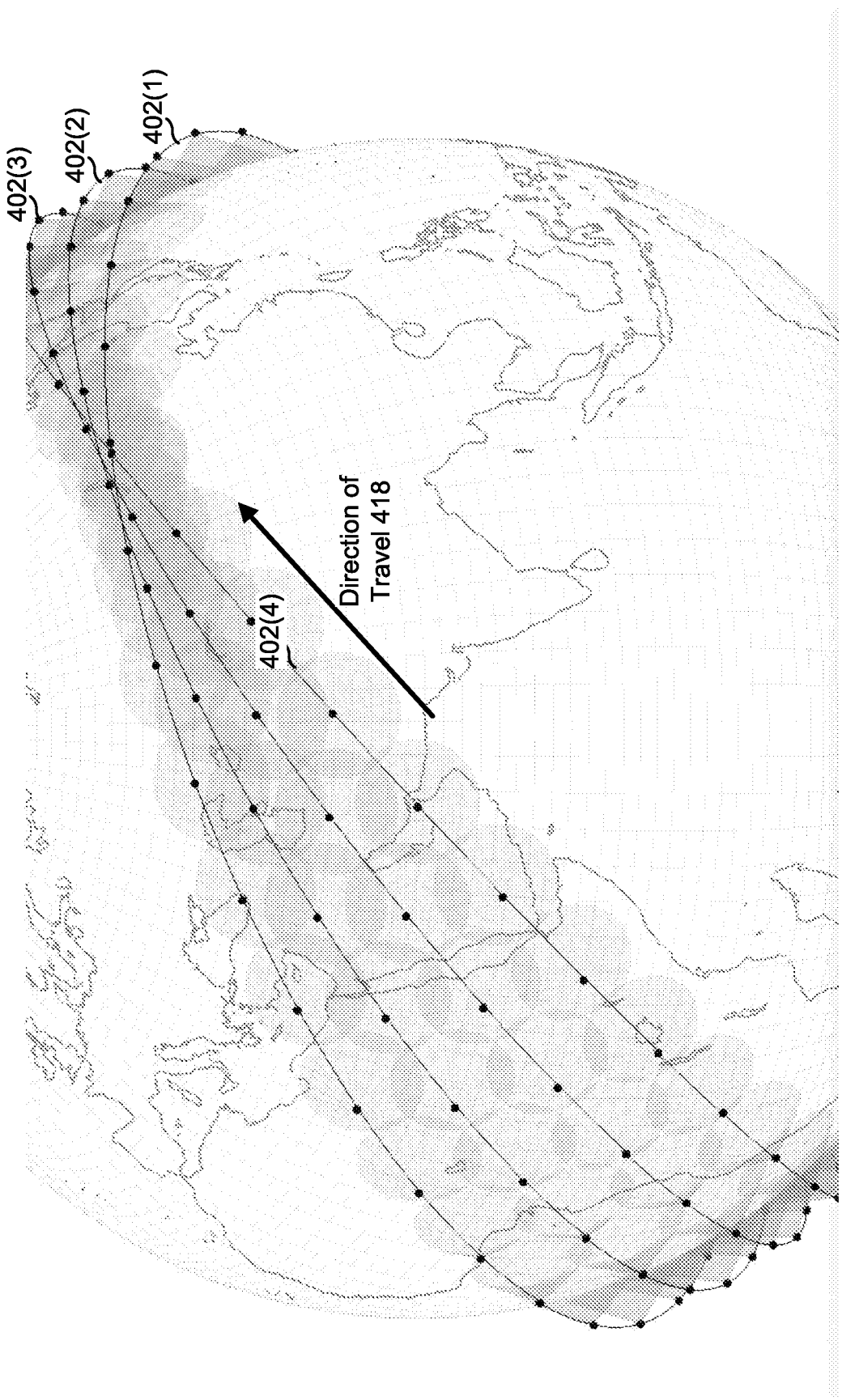
FIG. 4 illustrates a constellation of satellites that is similar to a Walker Delta Pattern constellation.

FIG. 4 illustrates a constellation of satellites that is similar to a Walker Delta Pattern constellation. The satellites are represented by dots on the lines spanning the globe and the lines represent the orbital paths of the satellites. The satellites on one orbital path are said to be in-plane, as the orbital path that the satellites share, albeit separated in time, forms at least approximately, an orbital plane. For purposes of explanation, only four orbital planes 402 are shown, but move planes or fewer planes might be implemented. As the orbits and the orbital planes, at least approximately, define great circles, the orbital planes will intersect. The arrangement of intersections might vary from what is shown in FIG. 4. Arrow 418 indicates a general direction of travel of the satellites. The positions of the orbital planes over the surface of the Earth are shown by way of example and other positions might be used instead.

In the reference frame of a given satellite, the two adjacent satellites in the same orbital plane might be referred to as the "forward satellite" and the "aft satellite" (or "north satellite" and "south satellite", respectively) whereas the adjacent satellites in adjacent, or nearby, orbital planes might be referred to as the east and west satellites. As is known from orbital mechanics, the east and west satellites, being in different orbital planes than the given satellite, would not appear to be stationary in the reference frame of the given satellite. Instead, the east and west satellites, if in stable orbits, will appear to move in a wide "figure eight" pattern over the course of an orbit in the reference frame of the given satellite, while the forward and aft adjacent satellites in the same orbital plane will be at, more or less, the same position in the reference frame of the given satellite.

Figure 5:
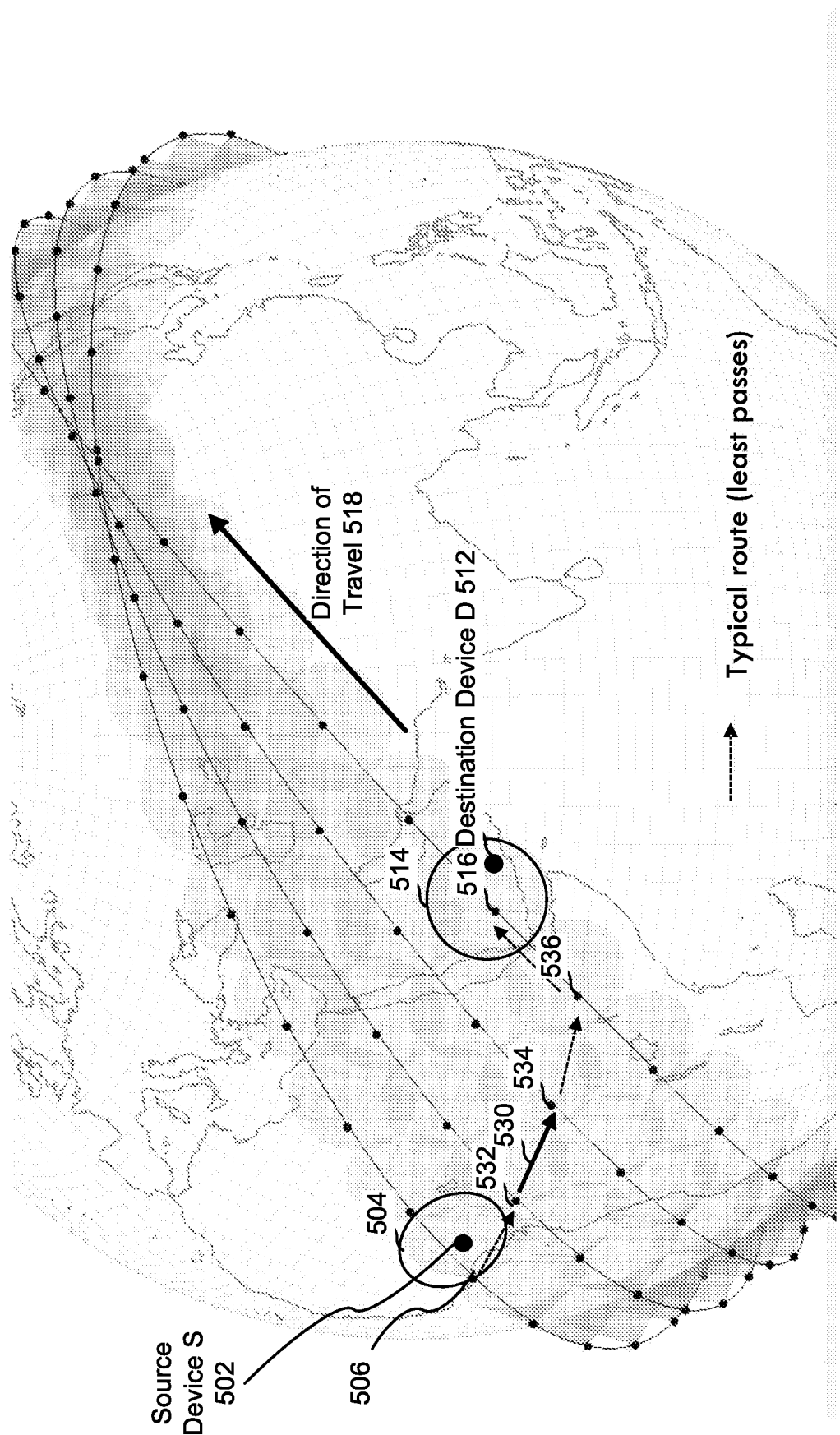
FIG. 5 illustrates a conventional message path over a Walker constellation.

FIG. 5 illustrates a conventional message path over a Walker constellation. As in FIG. 4, the visible satellites are shown as dots on lines representing orbital planes. Also shown in FIG. 5 are the satellites' respective footprints. As the satellite footprints overlap, continuous coverage can be implemented over the surface of the Earth.

As shown, a source device 502 is within a footprint 504 of a satellite 506, while a destination device 512 is within a footprint 514 of a different satellite 516. Arrow 518 indicates a direction of travel of the satellites. The message path 530 in this example is {device S 502, Sat 506, Sat 532, Sat 534, Sat 536, Sat 516, device D 512}. The link from Sat 506 to Sat 532, and also those to Sat 534 and Sat 536 are in the "east" direction in the reference frames of each of those satellites. The link from Sat 536 to Sat 516 is in a forward direction.

In this illustration, the message path follows a sequence of links and the inter-satellite links are to adjacent, or neighboring, satellites. For a constellation of satellites that are all within one orbital plane, it might be that their collective footprint provides good coverage for a strip of the surface and for a given satellite, the adjacent satellites are in the same orbital plane and so they remain stationary in the reference frame of the given satellite. As a result, simple, highly-directional antennae can be used for satellite-to-satellite transmissions. To obtain further coverage, a satellite in one orbital plane may need to transmit to a satellite in another orbital plane, such as in the case where the destination device is outside the collective footprint of the satellites that are in the orbital plane that covers the source device. This is shown in FIG. 5. In the approach of FIG. 5, a side (eastward, in this example), wide-angle antenna to a second satellite that is in a different orbital plane is needed.

Figure 6A:
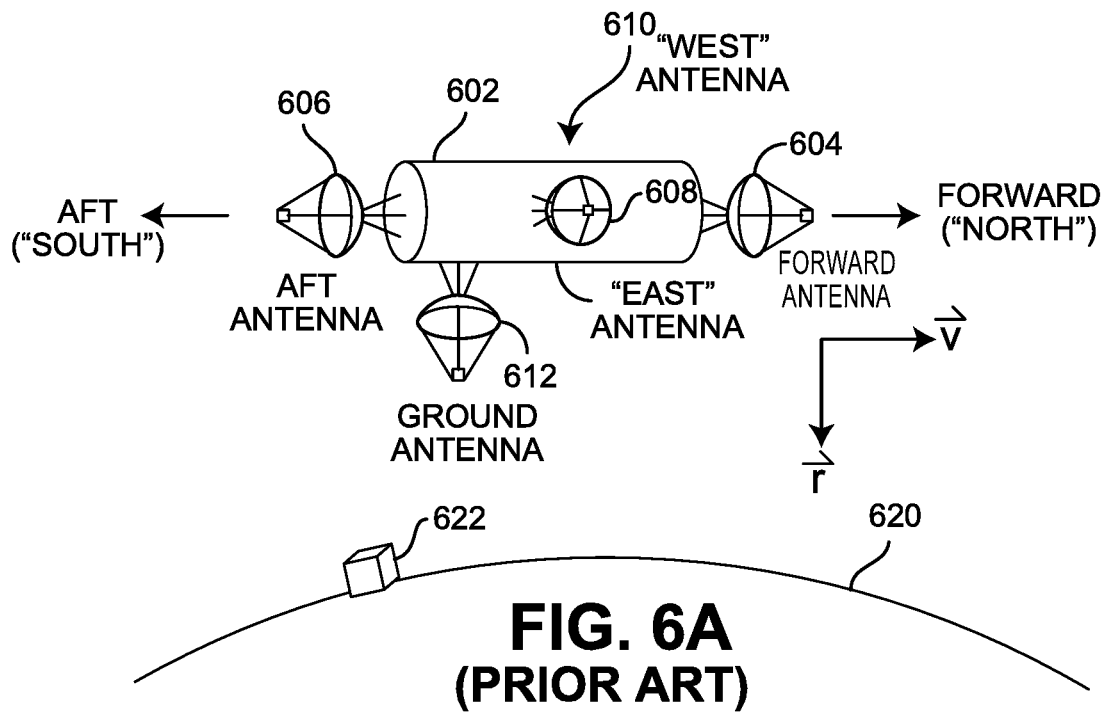
FIGS. 6A and 6B illustrate a satellite that might be used as one of the satellites in the constellation shown in FIG. 5.
Figure 6B:
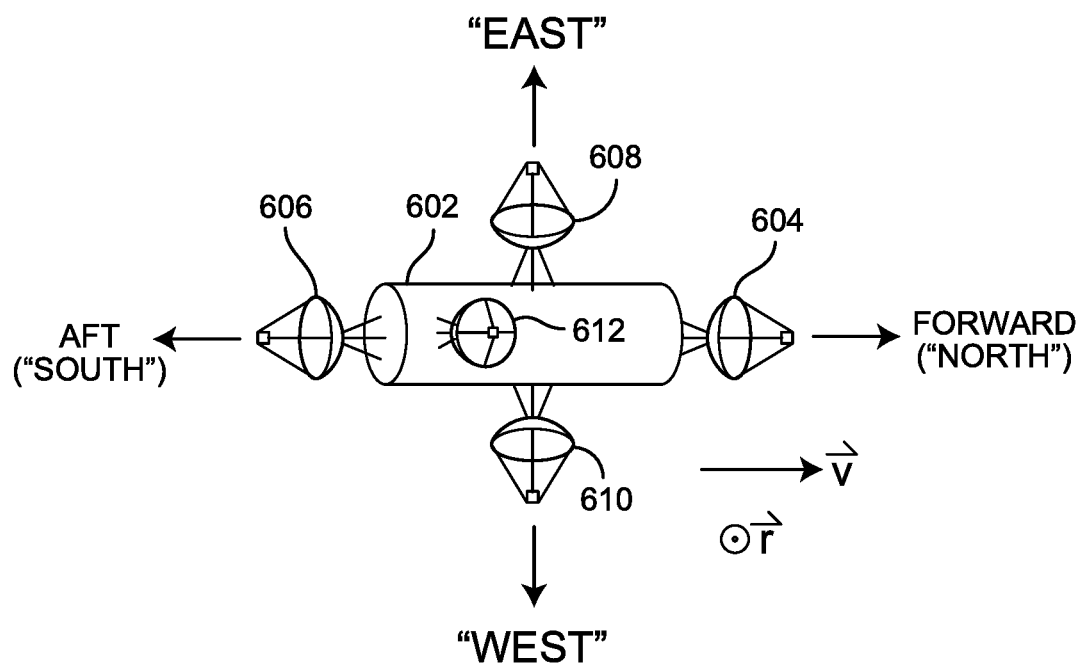

FIG. 6 illustrates a satellite 602 that might be used as one of the satellites in the constellation shown in FIG. 5. In addition to electronics, solar power generation, propulsion, maintenance and other satellite details not shown, satellite 602 includes various antennas. FIG. 6(A) shows a forward antenna 604 that faces in the direction of travel of satellite 602 (i.e., in the direction of the velocity vector of satellite 602, more or less). An aft antenna 606 faces in the opposite direction of travel of satellite 602. An east antenna 608 (i.e., one that more or less faces in the direction perpendicular to the radial vector of satellite 602 and perpendicular to the velocity vector of satellite 602 that is by convention referred to as "east" even though that might be unrelated to the easterly direction on the surface of the Earth) is shown, and satellite 602 also has a west antenna 610, not shown. FIG. 6(B) shows a view looking up from below at satellite 602, in which the west antenna 610 is shown. A ground antenna 612 is used for communications between satellite 602 and a ground device or ground station, such as station 622 on the surface 620 of the Earth, whereas the forward antenna 604, the aft antenna 606, the east antenna 608, and the west antenna 610 are used for inter-satellite communications within the constellation.

The inter-satellite communication between a satellite and its westward and eastward neighbors in different orbital planes can be troublesome, as the positions of the neighbors change relative to the reference frame of the satellite. Inter-plane connections typically use multiple low-gain, wide beamwidth antennas for east antenna 608 and west antenna 610 to deal with the relative motion of the westward and eastward neighbors. This may limit the data rate and/or increase power requirements in an inter-plane link budget. Data rates can be increased through increased transmission power, but that could complicate power budget requirements. Satellite 602 might use a higher gain, narrower beamwidth, steerable antenna to point in the present direction that the westward and eastward neighbors and change directionality as those neighbors move in the satellite 602's reference frame. The pointing of such antennas could be controlled in an active feedback loop, or alternatively, pointing the antennas in directions determined by predicted locations of the neighbors predicted according to orbital mechanics. A phased-array antenna could be used to digitally steer the antenna beam to decrease risk of mechanical failure on the spacecraft, but still that involves increased complexity and mass on the satellite 602 as high gain, narrow beamwidth antennas are bigger than low gain, wide beamwidth antennas.

Unlike the east antenna 608 and the west antenna 610, the forward antenna 604 and the aft antenna 606 are simpler to implement. With a suitable attitude control system, the forward and aft satellite neighbors remain nearly static in the satellite 602's reference frame and thus very high gain and very narrow beamwidth antennas can be used without requiring complex steering capability and they can provide a high data rate link in both directions. At high enough frequencies, a very high gain patch antenna could still be small enough to fit on the face of even a 1U-sized nanosatellite (i.e., a 35 dB gain V-band, or 60 GHz, antenna, which may have a diameter of about 10 cm).

Figure 7:
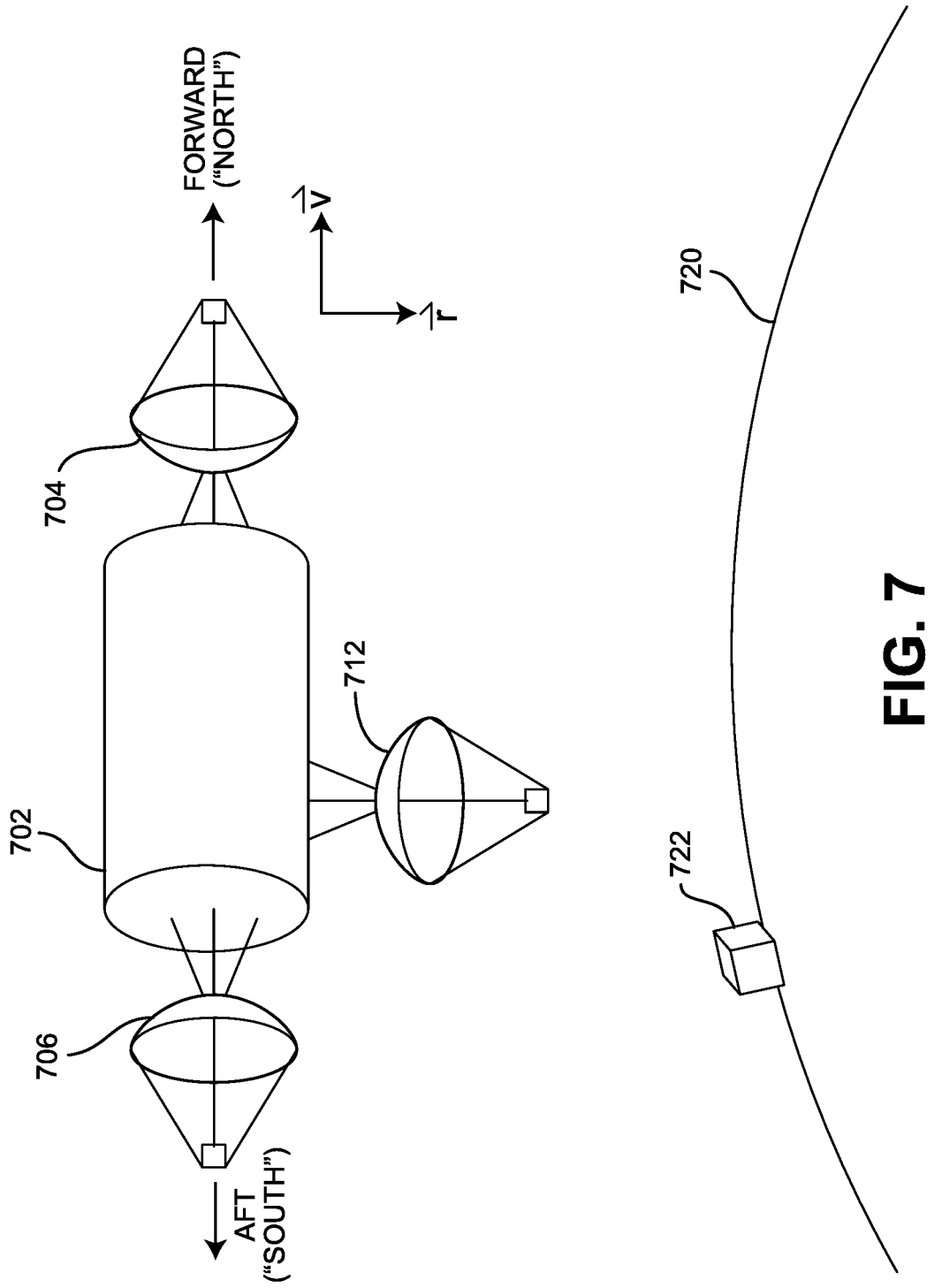
FIG. 7 illustrates an improved satellite that can handle inter-satellite communications in a constellation having a Walker constellation arrangement or other multi-plane constellation.

FIG. 7 illustrates an improved satellite 702 that can handle inter-satellite communications in a constellation having a Walker constellation arrangement or other multi-plane constellation. With programming and other configurations (not shown in this figure, but shown and explained elsewhere herein), satellite 702 can handle inter-satellite communications using a forward antenna 704 and an aft antenna 706 without requiring complex east and west antennas. A ground antenna 712 is used for communications between satellite 702 and a ground device or ground station, such as station 722 on the surface 720 of the Earth.

Figure 8:
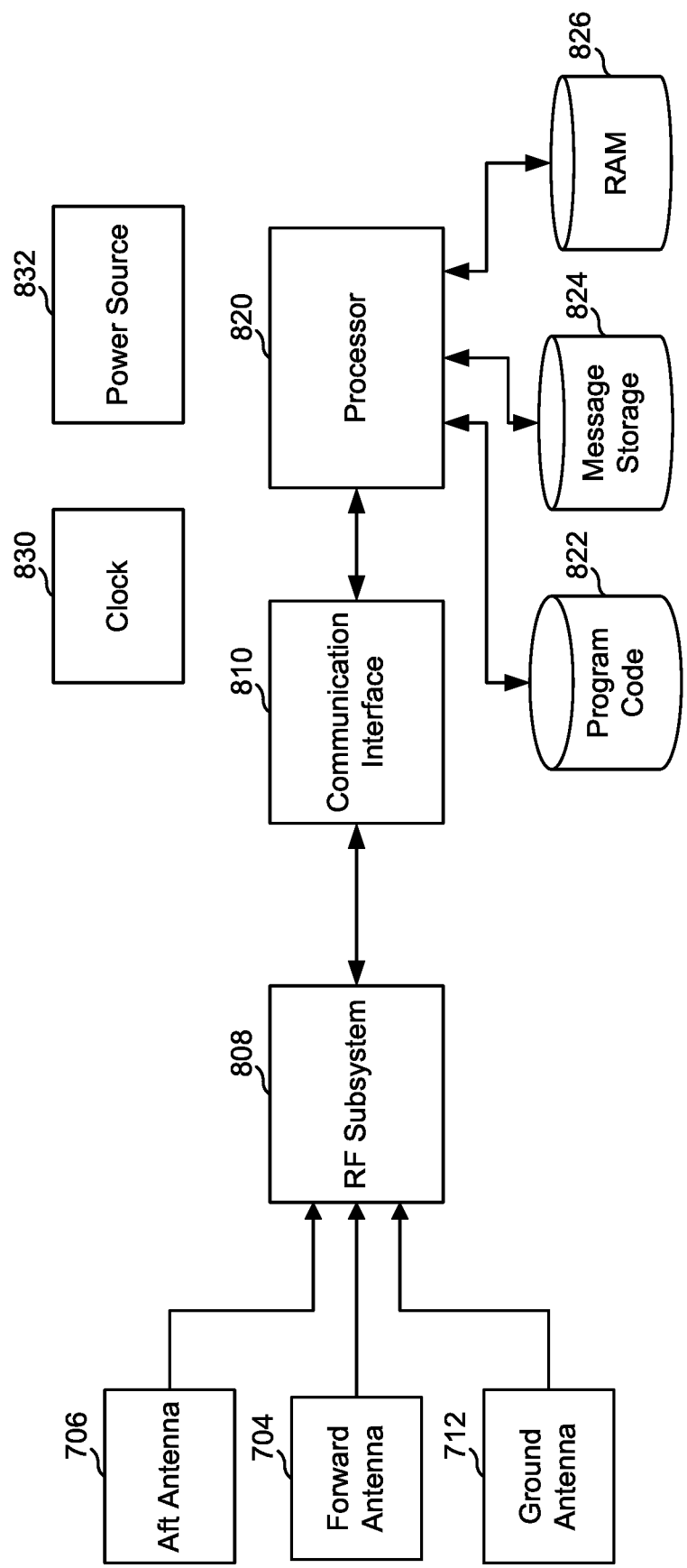
FIG. 8 is a block diagram of elements of the satellite shown in FIG. 7.

FIG. 8 is a block diagram of elements of satellite 702. The interconnections shown are generally electrical connections, such as via wiring or busses, and might be contained within a satellite with the antennas mounted externally. In this example, the aft antenna 706, the forward antenna 704, and the ground antenna 712 are coupled to an RF subsystem 808 that can receive signals that impinge on those antennas and can send signals to those antennas for transmission. A communications interface 810 handles the sending of baseband data or signals to the RF subsystem 808 and receiving baseband data or signals from the RF subsystem 808. The data sent via the communications interface 810 can be specified by a processor 820 that operates according to program code stored in program code storage 822 and readable by the processor 820. Alternatively, the processing functionality might be implemented by an FPGA or other circuitry.

As shown, the processor 820 also has access to random access memory 826 for various purposes and a message storage unit 824. In some implementations, the program code storage 822, the random access memory 826, and the message storage unit 824 might be a common data structure. Some or all of the elements shown might be provided power by a power source 832 and one or more clock signals by a clock 830.

Other elements, such as control systems, might be handled by processor 820 or other processors on the satellite and they might or might not communicate. Program code storage 822 also may be used for storing temporary variables or other intermediate information during execution of instructions to be executed by processor 820. The program code might be replaceable in response to commands sent to the satellite. The program code, when stored in non-transitory storage media accessible to processor 820, might render the processing portion of the satellite into a special-purpose machine that is customized to perform the operations specified in the instructions. The memory components might be static or dynamic memory, preferably capable of operation in a space environment. A maintenance interface might be provided. Customized hard-wired logic, one or more ASICs or FPGAs, firmware and/or program logic which in combination with the processor 820 to implement a special-purpose machine might be provided. Execution of sequences of instructions contained in program code storage 822 might cause processor 820 to perform process steps described in flowcharts and elsewhere herein. In alternative embodiments, hard-wired circuitry may be used in place of or in combination with software instructions. The term "storage media" as used herein refers to any non-transitory media that store data and/or instructions that cause a machine to operation in a specific fashion. Such storage media may comprise non-volatile media and/or volatile media.

One aspect of the operation of processor 820 and/or the program code is to receive messages and transmit messages, to the ground and to other satellites so that as a system, the system delivers messages from sources to destinations. When the satellite receives a message on the uplink via the ground antenna 712, the processor might determine, based on the location of the intended recipient having the destination device, what message path and thus which set of inter-satellite links to use for passing the message. Since the time it takes to move data through a satellite network is quite fast relative to the motion of the satellites around the Earth, the satellite that rests above the recipient when the message was initiated at the source may well still have the destination device within its footprint when the message is finally delivered (or "terminated" in the telecommunications industry). Even if this is not the case, that fact can be calculated and anticipated as the data is delivered through the network. As a result, a satellite that is passing a message, or making a connection, determines whether or not the satellite that is to downlink the message to the recipient's destination device is in the same orbital plane as the uplink satellite. If it is not, the message is transferred to another orbital plane in a cross-plane transfer. Once the message has arrived at a satellite that is in the orbital plane of the satellite that is to do the downlink (or terminate) the message, the signal can be passed the rest of the way through the forward links or aft links on the satellite until the message reaches the final destination satellite.

Each message can have a message path and a message's path can either be provided explicitly with the messages or can be determined by program steps executed on the satellite or elsewhere. However calculated, the message path follows an orbital plane until a suitable cross-plane transfer is available using the forward/aft antennas. The message path might be stored at a satellite and used to determine which antenna to use to retransmit and thus forward a message received.

Figure 9:
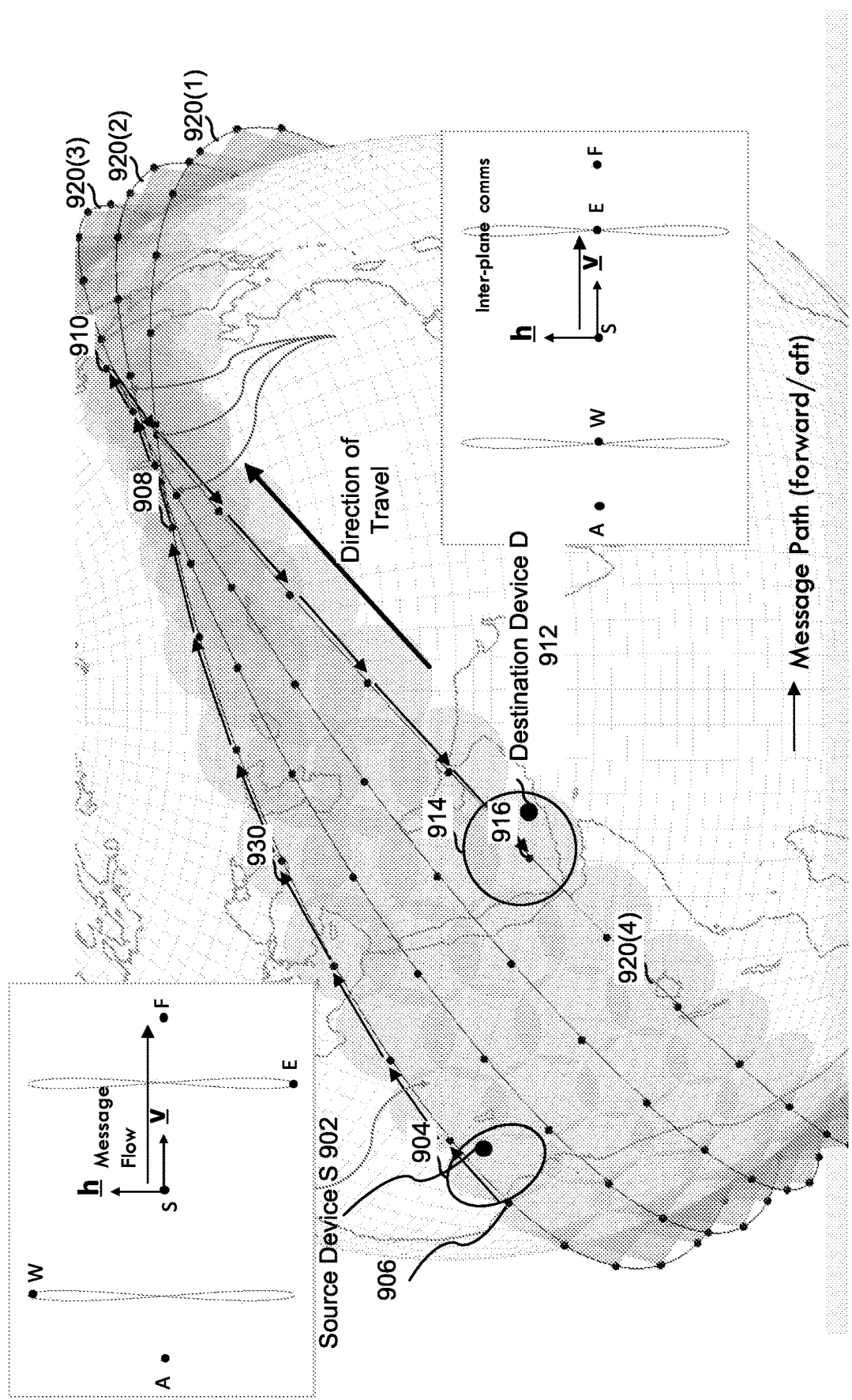
FIG. 9 illustrates an example of a message path that follows an orbital plane to a cross-plane transfer using forward/aft antennas.

FIG. 9 illustrates an example. As shown, a source device S 902 is within a footprint 904 of a satellite 906, while a destination device D 912 is within a footprint 514 of a different satellite 516 that is in a different orbital plane. A message path 930 over which messages can be passed between device S 902 and device D 912 follows the satellites in a first orbital plane 920(1) until satellites from other orbital planes cross the first orbital plane 920(1), at which point the message is forwarded from a satellite in the first orbital plane 920(1) to a satellite in another orbital plane until it is passed to a satellite in an orbital plane 920(4) in which satellite 516 is travelling. While the path of travel is longer than the east/west approach, it can be done with fewer antennas and possibly higher throughput than otherwise. In this example, the message path is {device S 902, Sat 906, . . . , Sat 910, . . . , Sat 916, device D 912}. The link or links from Sat 906 to Sat 910 are inter-plane transfers, but are done using the directional forward antennas of the satellites in the constellation.

Depending on design considerations, inter-plane transfers might be limited to adjacent planes. For example, the message path might require a link from a satellite in orbital plane 920(1) to a satellite in orbital plane 920(2), and then to a satellite in orbital plane 920(3), and then to a satellite in orbital plane 920(4). Or, the message path might skip one or more adjacent orbital planes. In some situations, limiting the links to be one orbital plane at a time might be preferred, as cross-plane satellites might stay in range longer the closer their orbital planes are. In some variations, the message path can skip adjacent orbital planes, and can also skip adjacent satellites in the same orbital plane, if desired.

The message path 930 benefits from the high data rate potential of the forward and aft inter-satellite links and since westward and eastward satellites in other orbital planes pass in front of or behind some satellites in other orbital planes, the use of forward and aft antennas could be sufficient and reduces or eliminates need for additional communications components for side-to-side communications, lowering spacecraft complexity, mass, and cost, while actually increasing network throughput and decreasing network latency.

The message path 930, on average, might have more links in order to transmit messages. Despite the increase in the number of links that are made, the path might still be faster due to data rate increases than the typical eastward or westward links that are established in conventional inter-satellite link architectures. Depending on the antenna/link specifications and geometry for the eastward and westward links, the forward aft directions (assuming the same power per bandwidth across all links) can be in excess of 1000 times faster in comparison simply because of the higher gain antenna and reduced pointing offset (from reduced relative orbital motion). As a result, the increased number of required links to send data is made up for in reduced network latency as well as cost, complexity, mass, and power of each spacecraft in the network.

Figure 10:
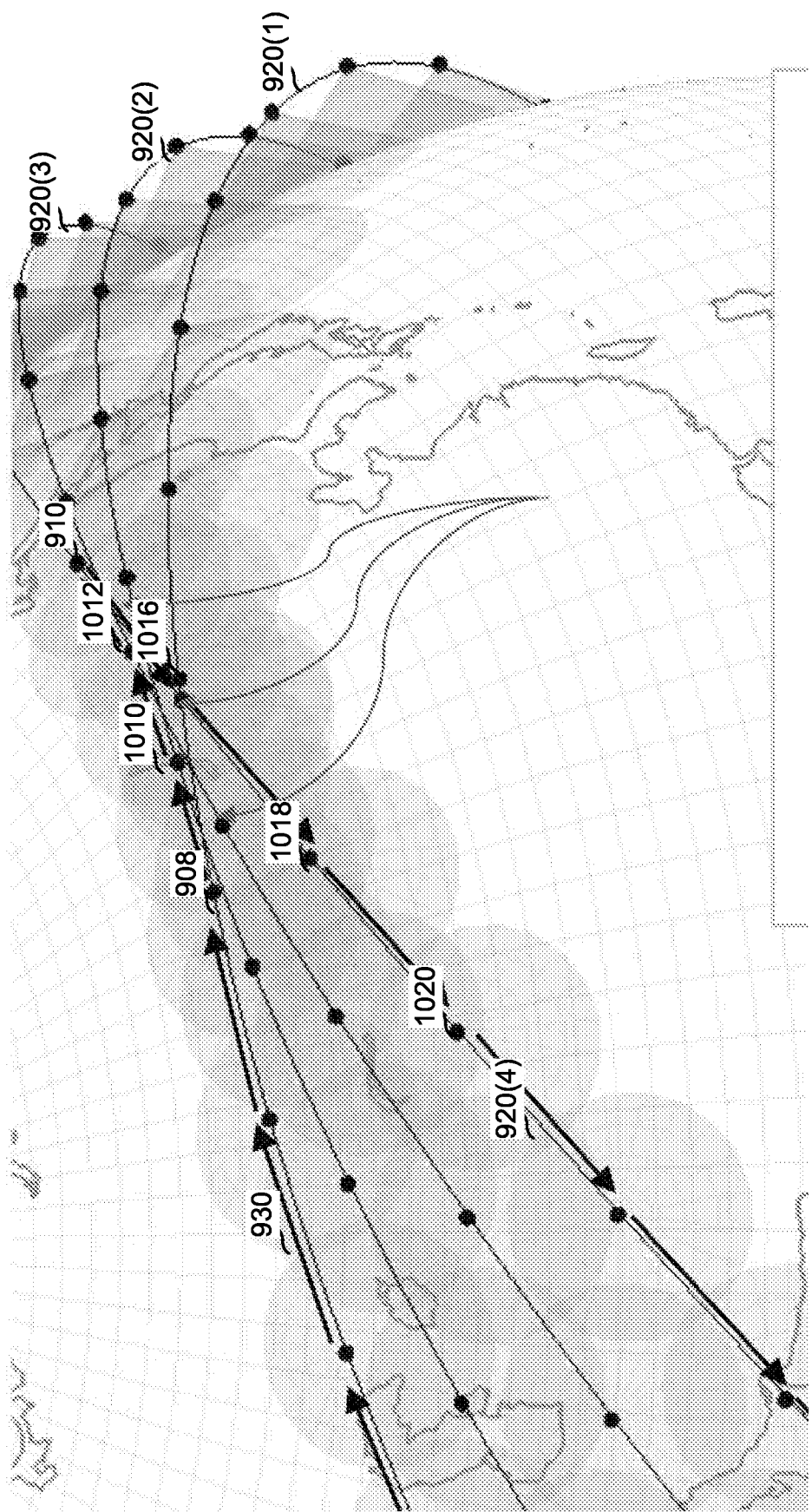
FIG. 10 illustrates cross-plane transfers in more detail.

FIG. 10 illustrates the cross-plane transfers in more detail. As shown there, the message path 930 in part is { . . . , Sat 908, Sat 1010, Sat 1012, Sat 910, Sat 1016, Sat 1018, Sat 1020, . . . }, where Sat 908 is in orbital plane 920(1), Sat 1010 is in orbital plane 920(2), Sat 1012 is in orbital plane 920(3), while Sat 910, Sat 1016, Sat 1018, and Sat 1020 are in orbital plane 920(4).

Combinations with Other Link Types

As described above, a message path could be from a source device on the ground, an uplink to a satellite, one or more inter-satellite links, crossing orbital planes as needed, and a downlink from a satellite to a destination device. Inter-satellite links can also be combined in message paths with "bent-pipe" links and "store-and-forward" links.

With the bent pipe approach, a satellite receives data from the source device and forwards the data to a ground repeater that is within that satellite's footprint. The ground repeater used would be one that is also in the footprint of a second satellite and the ground repeater forwards the data to the second satellite. If the destination device is within the second satellite's footprint, the second satellite can send the data to the destination device. If the destination device is not within the second satellite's footprint (and any satellite footprints the source device and destination device are in do not overlap), the second satellite can send the data to another ground station, which would then forward to a third satellite, and so on until reaching a satellite that has a footprint that encloses the destination device. This can involve suitably placed ground repeater stations. The message path might be {source device, satellite 1, ground repeater 1, . . . , repeater N−1, satellite N, destination device}, where the ellipsis represents zero or more additional satellites and repeaters and where N>1. The particular ground repeaters and satellites that are used to form the source-destination link path might be determined by a computer process that is executed by the devices, the satellites, the ground repeaters, or elsewhere and conveyed to the devices/satellites/repeaters that need to know the message path in order to correctly forward or transmit a message. That computer process can run in real-time or can run in advance to derive data tables for use in determining message paths based on device/satellite locations and timing.

Figure 11:
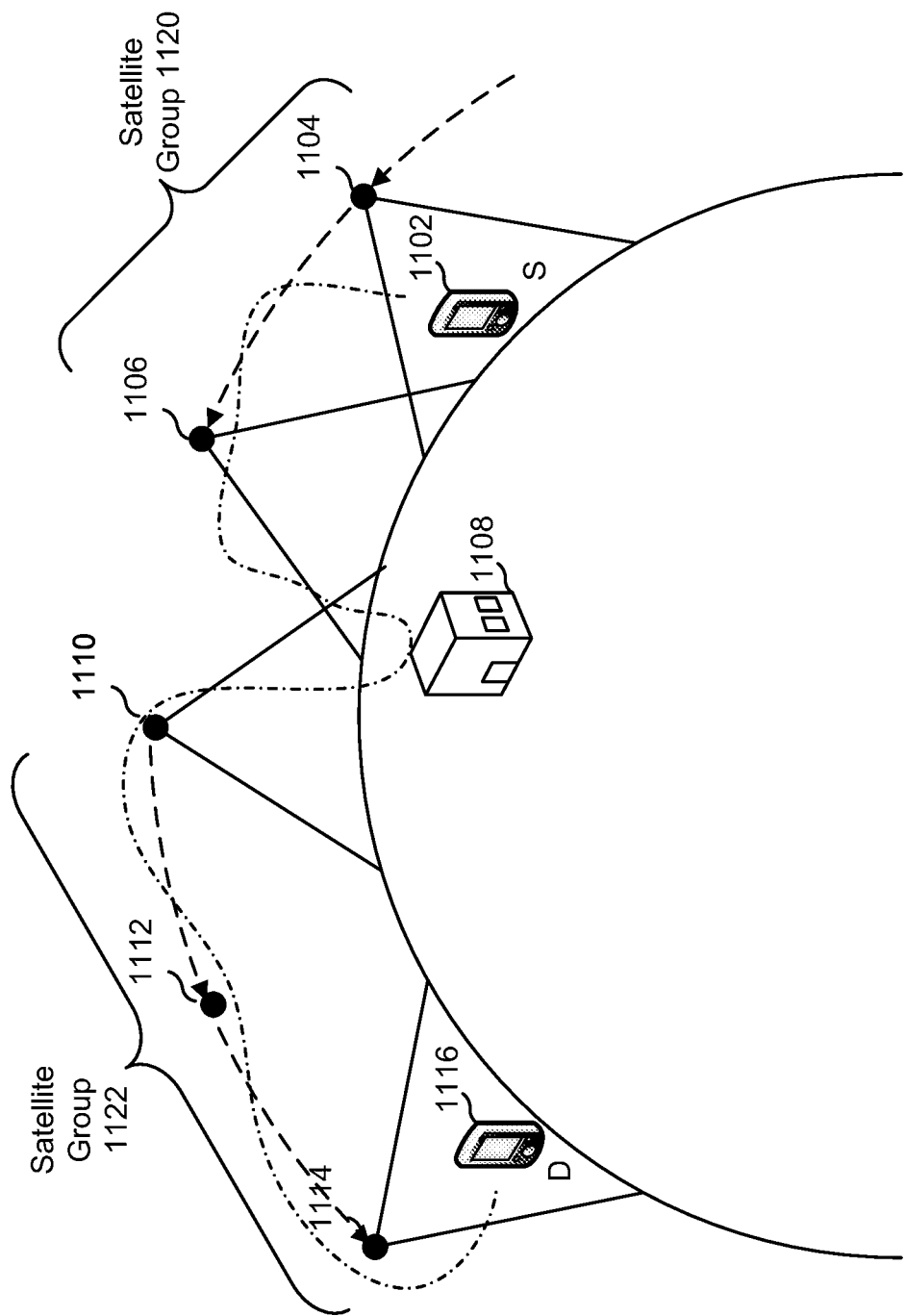
FIG. 11 illustrates an example of a message path using a bent-pipe link.

FIG. 11 illustrates an example of a message path using a bent-pipe link. Shown there are a source device S 1102, a satellite 1104 and a satellite 1106 in one satellite group 1120, a ground station 1108, a satellite 1110, a satellite 1112, and a satellite 1114 in a satellite group 1122, and a destination device D 1116. The satellite footprints are also shown, and notably, ground station 1108 is within satellite footprints of both satellite 1106 and satellite 1110.

In this example, source device S 1102 sends a message to destination device D 1116 and those devices are positioned at the time of transmission, for some reason or other, such that it is more desirable to use a ground station 1108 than an entirely satellite-based set of links. In such case, the message path is {source device S 1102, Sat 1104, Sat 1106, ground station 1108, Sat 1110, Sat 1112, Sat 1114, destination device D 1116}. In this example, ground station 1108 might be used to bridge one or more orbital plane based on the timing of the transmission, perhaps to shorten the path. Such a consideration might be computed when computing the message path, wherever that is computed.

It may be that ground station 1108 does not bridge an orbital path. For example, satellite 1104, a satellite 1106, and satellite 1110 might all be in one orbital plane. Perhaps satellite 1112 and a satellite 1110 are not in the same orbital plane, in which case message passing would be timed based on an orbital plane crossing, or passed to other satellites in the same orbital plane until the message reaches a satellite that has an orbital plane crossing occurring. Although not shown, there might be more than one ground station. This might be used for redundancy or to simplify constellations.

Another approach is the "store and forward" approach. This approach takes into account that a satellite's footprint is moving over the surface (excluding geosynchronous satellites, of course) and so at one point in time the satellite's footprint could cover the source device but not the destination device, but at a later point in time, the satellite having moved along in its orbit, could cover the destination device while the source device is outside the satellite's footprint. In this scenario, the transmission of data is from the source device to the satellite while the source device is within the satellite's footprint, the satellite stores the data for a time, and then later when the destination device is within the satellite's footprint, the satellite sends the data to the destination device. This can result is large latencies in transmission due to the time it takes the satellite to move to a new position in its orbit. The particular store-and-forward delay period between the receipt from the source device and the transmission to the destination device can be determined by a computer process that is executed by the devices, the satellites, or elsewhere and conveyed to the devices/satellites that need to know the link path in order to correctly time the forwarding or transmitting of data. That computer process can run in real-time or can run in advance to derive data tables for use in determining message paths and storage time requirements based on device/satellite locations. In this approach, the message path might be {source device, satellite 1, internal storage, satellite 1, destination device}.

Figure 12:
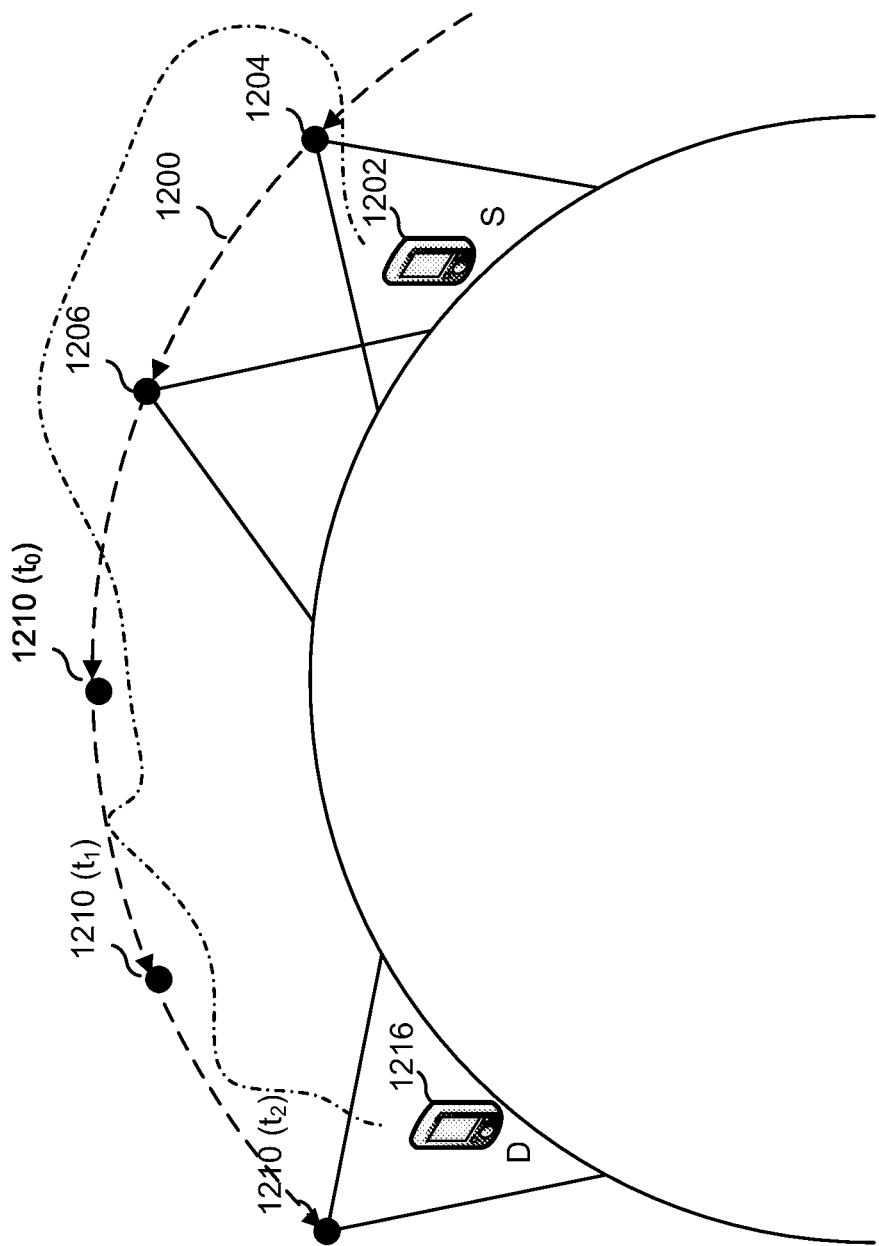
FIG. 12 shows an example of store-and-forward, which might also be used with the bent-pipe approach of FIG. 11, with timed orbital plane crossing.

FIG. 12 shows an example that uses store-and-forward, which might also be used with the bent-pipe approach of FIG. 11, with timed orbital plane crossing. This might be useful where it is more cost-effective to hold a message than it is to transmit it through many links in an orbital plane. As illustrated there, satellites 1204, 1106, and 1201 are travelling in orbits indicated by 1200. A source device S 1202 can send a message to a destination device D 1216 by sending it to satellite 1204, which sends it to satellite 1206, which sends it to satellite 1210 at time t0. Satellite 1210 then stores the message during time $t_1$ and at time $t_2$, transmits it to destination device D 1216. It may be that satellites 1204, 1206, and 1210 are not all in the same orbital plane. Using store-and-forward, the constellation takes advantage of the fact that satellite footprints move over the surface over time, as the orbit speed is often faster than the rotation of the Earth's surface. Since this method requires data to be held on-board spacecraft in the satellite network, system latencies can be quite high, but this might be useful in some cases.

With the store-and-forward, a satellite might also store/hold a message in order to allow time for a cross-plane satellite to become better aligned. It might be that a first satellite in one orbital plane is to transfer a message to a second satellite in another orbital plane and the first satellite will hold the message for a short period until the second satellite nears the orbital plane of the first satellite. In a more general case if a message path, there are delays inserted, such as the message path {source device, Sat 1, internal storage hold for 3.5 seconds, Sat 1, Sat 2, destination device}. One data structure that might be used is a message path with times associated with each link, such as {device 1/12:00:00, Sat 1/12:00:00.7, Sat 2/12:00:05.15, Sat 3/12:00:05.23, Sat 4/12:00:07.00, destination} and each satellite is programmed to compute the delay between links and noting a current clock time, holds a message until just before it is to be received by the next link. As with a time-independent message path, a time-tagged message path can be calculated on the ground, at the first satellite a message encounters, and passed with the message, or computed at each satellite based on a destination, a clock time and data defining the orbital paths of the satellites in the constellation. This can address the issue of having wide spacings between satellites in an orbital plane so that messages can be held until a passing satellite in another orbital plane is in position.

Inter-Satellite Link Geometry

When using inter-satellite links, the geometry of the communication link is driven by the orbital mechanics of the spacecraft in the constellation. In the reference frame of some reference satellite in a constellation, referred to herein as the "reference satellite", the forward, aft, eastward, and westward neighboring satellites actually orbit around the reference satellite, completing one revolution around the reference satellite for every orbit around the Earth.

Figure 13:
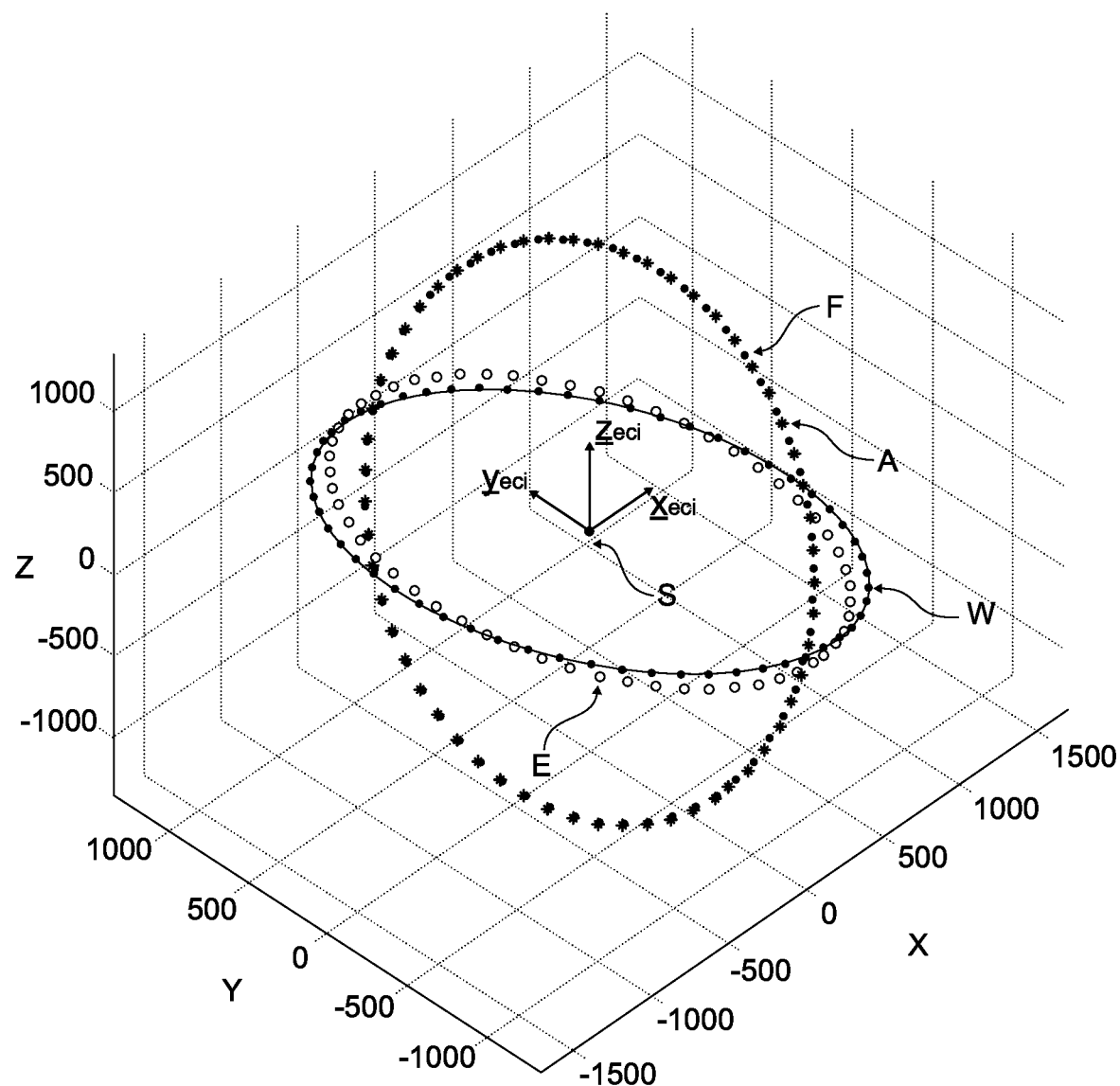
FIG. 13 illustrates orbital mechanics of a spacecraft in a constellation.

FIG. 13 illustrates this, showing neighboring satellite motion in the reference frame of the reference satellite in a hypothetical satellite constellation inclined by 51.6 degrees. Typically, spacecraft are equipped to maintain a particular orientation in space as they operate in orbit. In the reference frame of an orbiting spacecraft, the axes of the spacecraft body frame are maintained to align with the spacecraft velocity vector, nadir vector (toward Earth's surface, in the opposite direction as the radial vector), and orbital angular momentum vector. The nadir vector is not always exactly 180 degrees from the radial vector, but upon reading this disclosure, it should be apparent that one of the reference frame's axes can be parallel to the nadir vector or parallel to the radial vector, so long as consistency is observed where they are not the same.

In this reference frame, the relative position of the forward, aft, eastward, and westward neighboring satellites move in an orbit around the reference satellite where the forward and aft neighboring satellites remain in a nearly static position in front of and behind the reference satellite, respectively. The eastward and westward neighboring satellites move in a figure eight motion—along a kidney bean shaped loop—in which they move cyclically, and nearly entirely, in the direction of the reference satellite's orbital angular momentum vector.

Figure 14:
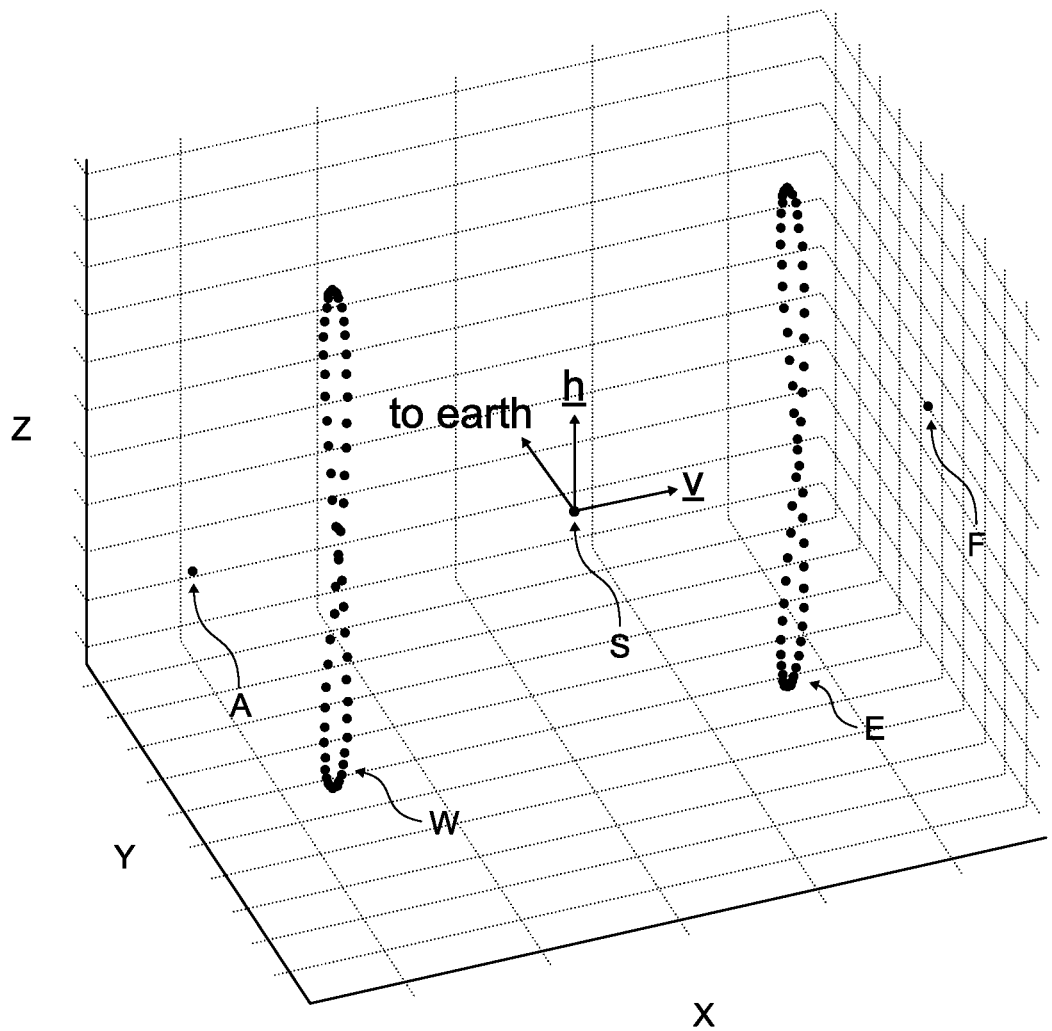
FIG. 14 illustrates neighboring satellite motion in a reference frame of a reference satellite for the same hypothetical satellite constellation of FIG. 13.
Figure 15A:
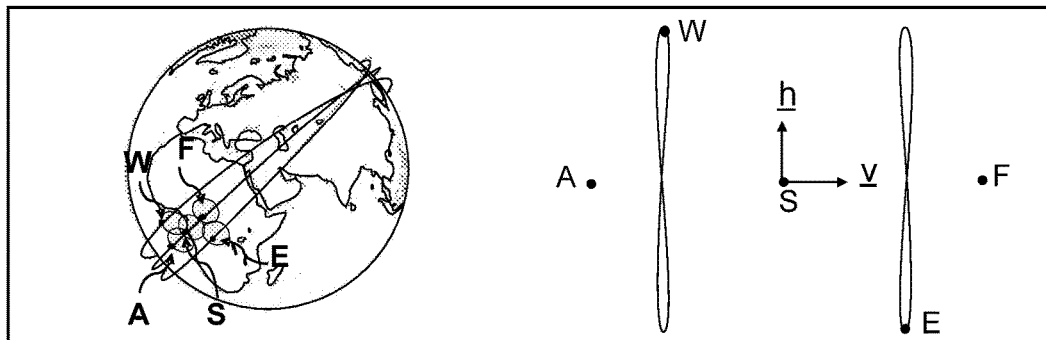
FIGS. 15A-D illustrate a juxtaposition of neighboring satellite positions over one period of their relative orbits.
Figure 15B:
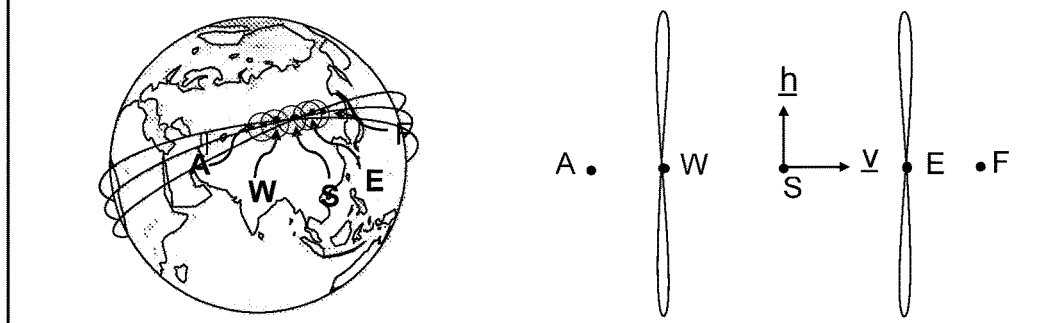
Figure 15C:
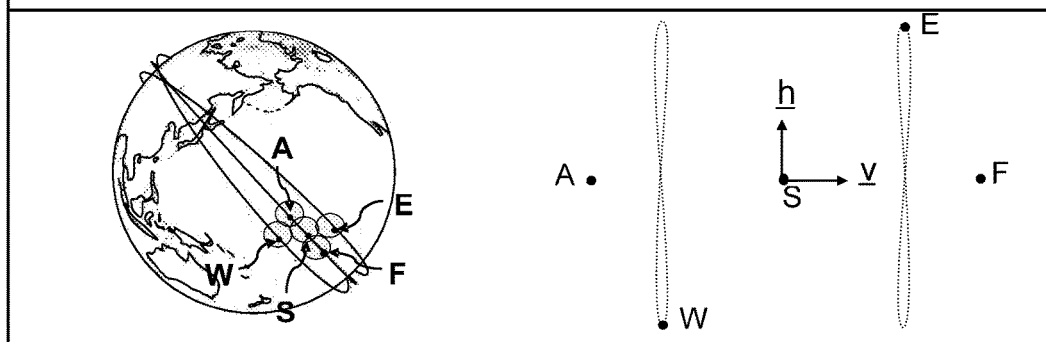
Figure 15D:
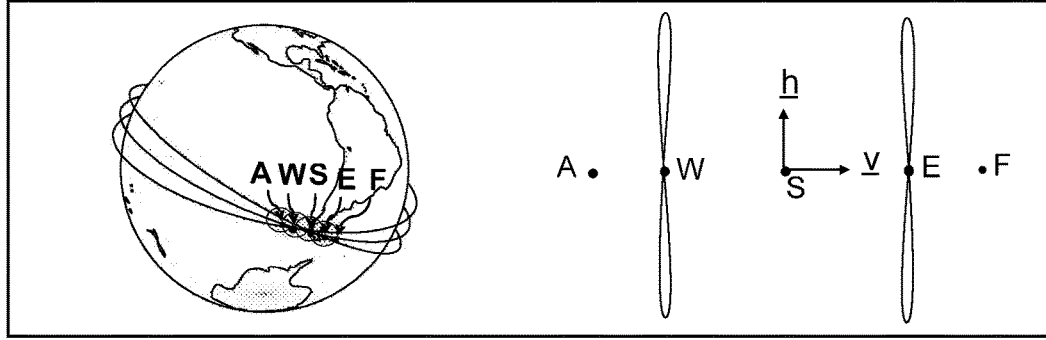

FIG. 14 illustrates neighboring satellite motion in the reference frame of the reference satellite for the same hypothetical satellite constellation inclined by 51.6 degrees. This cyclical motion forms a trajectory that takes the eastward (E) and westward (W) neighboring satellites above and below the reference satellite's velocity vector, crossing the velocity vector in front of and behind, respectively, the reference satellite. The forward (F) and aft (A) neighboring satellites remain relatively fixed in the reference frame. In other configurations and perhaps other places in a constellation, the satellite that is considered the eastward neighboring satellite might be the figure eight in the aft direction and the satellite that is considered the westward neighboring satellite might be the figure eight in the forward direction.

FIG. 15 illustrates a juxtaposition of neighboring satellite positions over one period (cycle) of their relative orbits. The left column shows the earth-centered reference frame positions of the reference satellite and the forward, aft, eastward, and westward neighboring satellites. The second column shows the same satellite positions, but in the reference frame of the reference satellite. The rows indicate the relative positions of the satellites over time, wherein FIG. 15(A) represents the time at which the reference satellite is at the ascending node, FIG. 15(B) represents the time at which reference satellite is 90 degrees past the ascending node, FIG. 15(C) represents the time at which the reference satellite is at the descending node, and FIG. 15(D) represents the time at which the reference satellite is 90 degrees past the descending node.

FIG. 16 illustrates the timing that results from the orbits shown in FIG. 15 and FIG. 9. The communication of messages between satellites need only be in the forward and aft directions. Cross-plane communications occur at cross-plane locations in the constellation, which might be the points in a satellite's orbit in which it is approximately 90 degrees ahead of both its ascending node and its descending node. These points in space are graphically illustrated in FIGS. 15(B) and 15(D) and are also shown in FIGS. 16(B) and 16(D). This way, messages or signals that are to be routed through inter-plane communications are passed forward or aft, to the satellite in its plane that is flying 90 degrees ahead of its ascending (or descending) node. This satellite is in a position in which its forward-looking antenna is pointed in the direction of the eastward and forward neighboring satellite and the aft-looking antenna is pointed in the direction of the westward and aft neighboring satellites. Depending on the plane change required, the satellite would route its message forward to the eastward satellite or aft to the westward satellite. If more than one plane change is required, the satellite that received the inter-plane communication can, in turn, use its forward- or aft-looking antenna to pass the message to yet another plane. Once the message has been routed to the destination plane, the forward and aft links in that plane can be used to pass the message within the plane until the message arrives at the satellite that is intended to downlink the message to the recipient's device.

Figure 17:
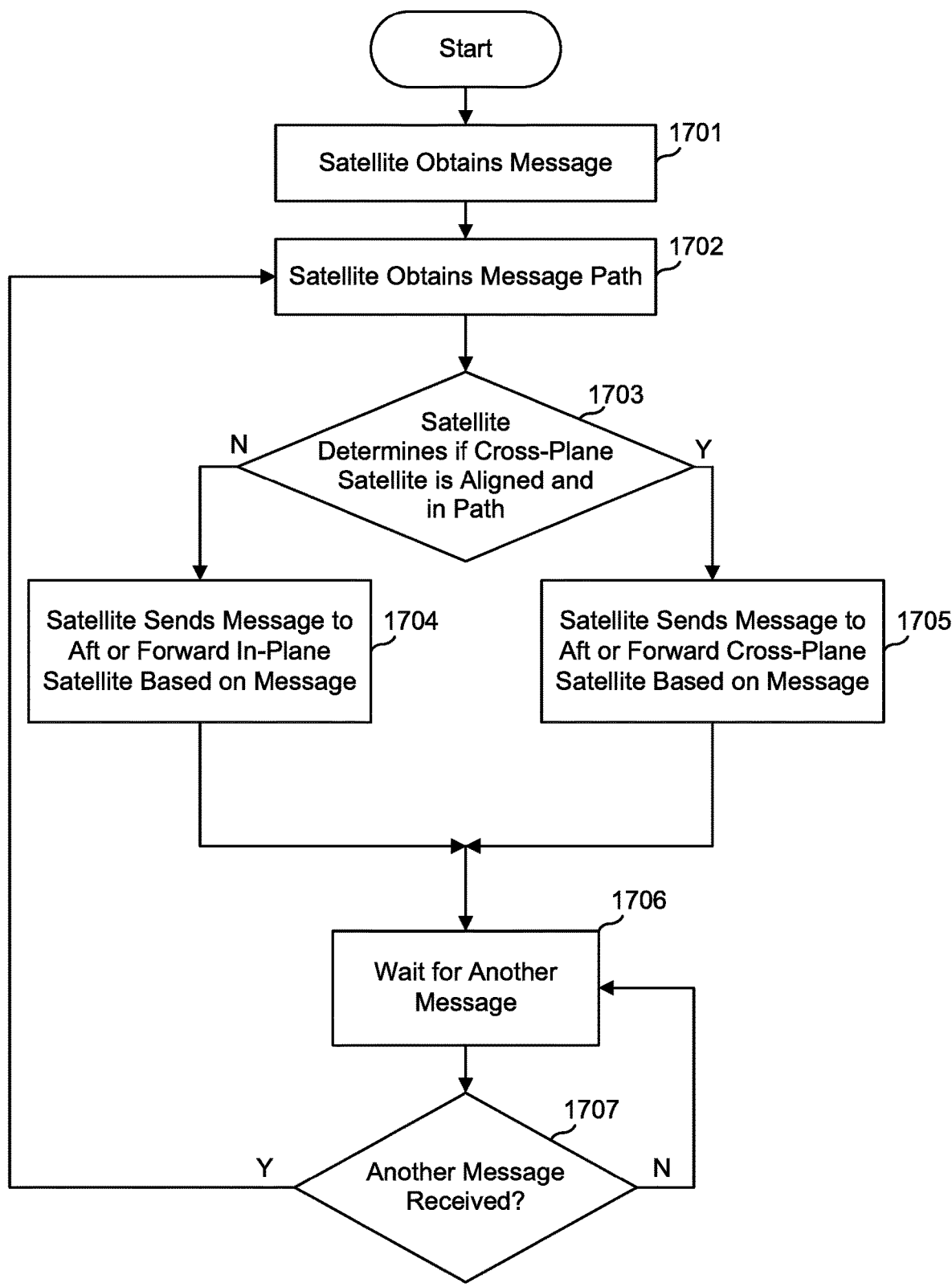
FIG. 17 is a flowchart of a process that might be executed by a satellite in handling messages.

FIG. 17 is a flowchart of a process that might be executed by a satellite in handling messages. In step 1701, the satellite obtains a message, from another satellite or via an uplink from the ground. In step 1702, the satellite obtains a message path. This could be by computing it on-board from a field of the message that indicates the destination, such as global coordinates. A processor in the satellite can compute, knowing current locations, orbital planes, etc. of satellites, its own position, and the global coordinates of the destination, to determine a path that needs only forward-looking and aft-looking message passing among satellites. The message path might be obtained by reading it from a message package.

In step 1703, the satellite determines whether a cross-plane satellite is aligned and in path, which might simply be to determine timing and location of the cross-plane satellite. If the cross-plane satellite is not there, in step 1704, the satellite sends the message aft or forward in-plane to another satellite. If the cross-plane satellite is there, in step 1705, the satellite sends the message aft or forward to the cross-plane satellite.

The satellite then, at step 1706, waits for another message, and/or performs other tasks and then, at step 1707, checks whether another message is received. If so, the process continues at step 1702 with the new message.

Spiral Constellations

Instead of distinct orbital planes, satellites might be arranged so that they each are in a separate plane, but neighboring satellites are stationary in the satellite's reference frame, albeit off to the side slightly. The satellites in this constellation thus form a spiral so that each other satellite can be reached from a starting satellite, using only forward and aft links.

Each satellite in the spiral can be thought of as in its own "plane" in the sense that it is like wrapping a string around a ball with each successive wrap/spiral slightly offset from the previous wrap/spiral. While satellites in an orbital spiral are equally spaced in true anomaly across 360 degrees, the ascending node of each satellite is offset westward as true anomaly increases, i.e., successive wraps around the globe. The result is that the last satellite in any spiral is approximately directly behind (in the direction of the velocity vector) the first satellite in the following spiral.

Figure 18:
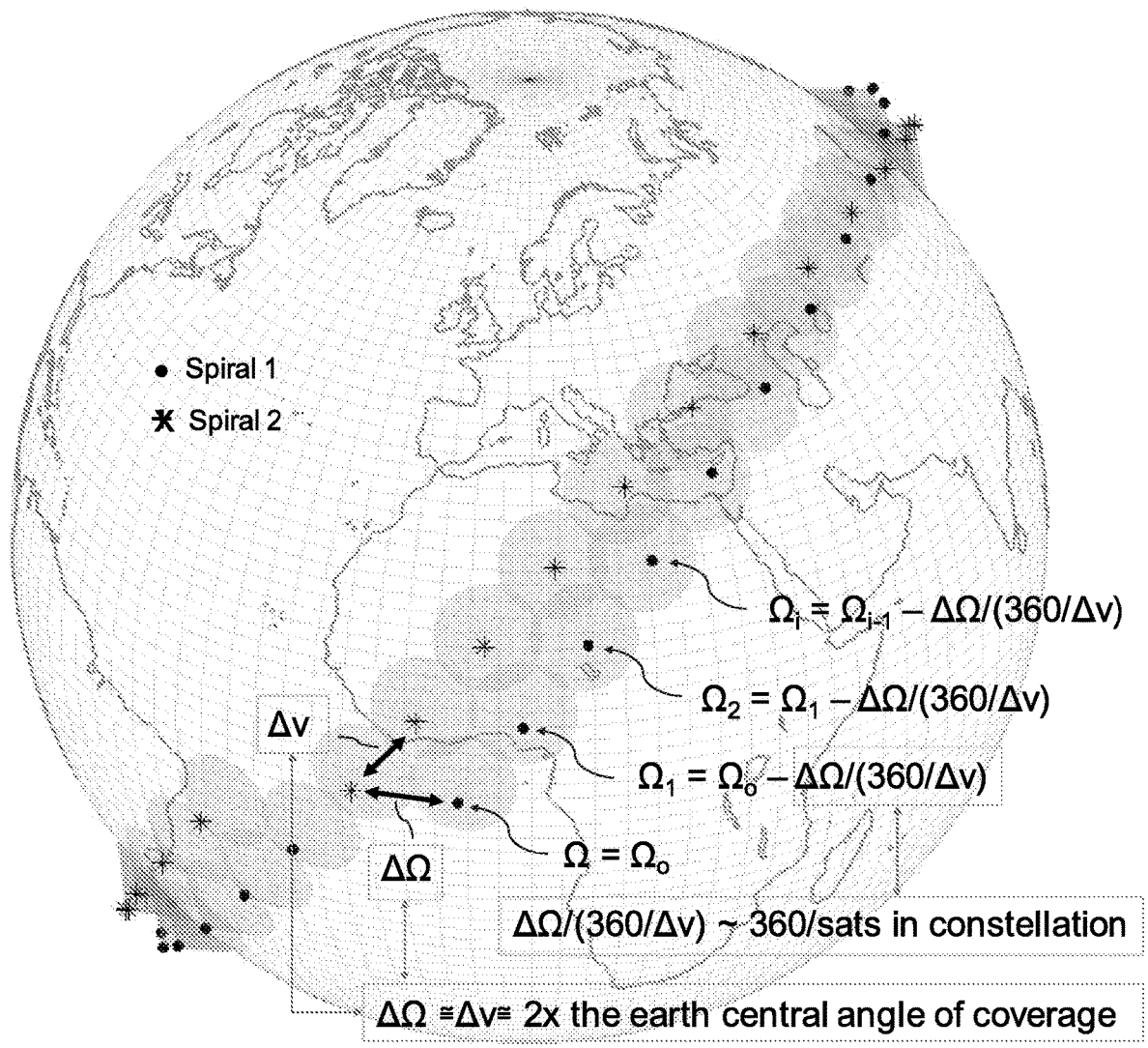
FIG. 18 illustrates geometry for orbital mechanics of a spiral constellation.
Figure 19B:
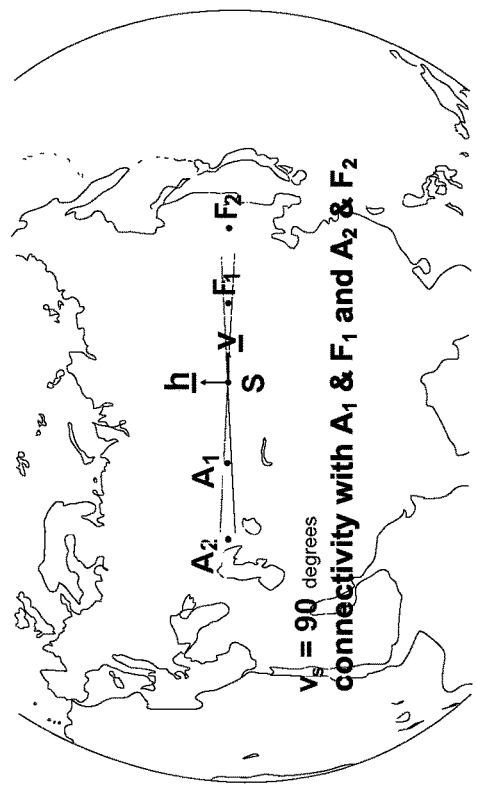
FIGS. 19A-D illustrate geometry for the forward and aft directions, relative to the reference satellite, in a spiral constellation.
Figure 19D:
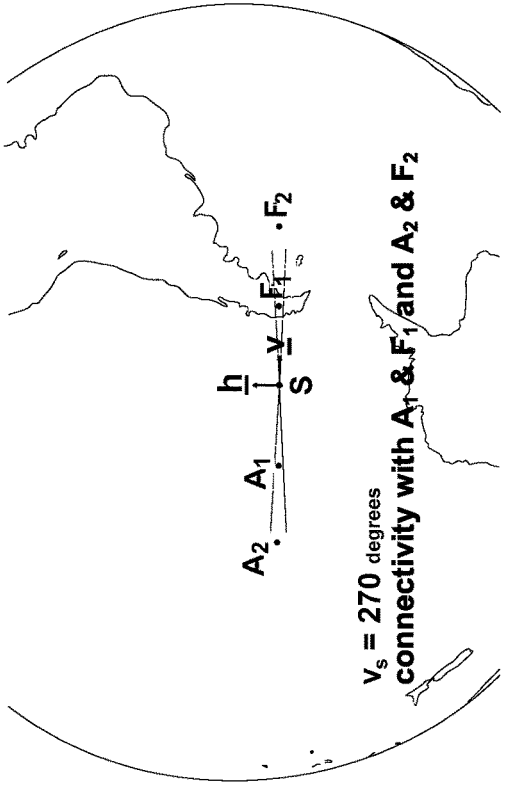
Figure 19A:
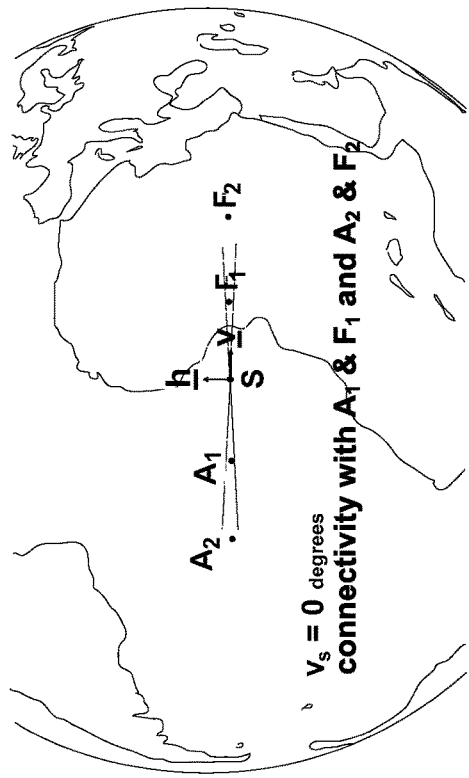
Figure 19C:
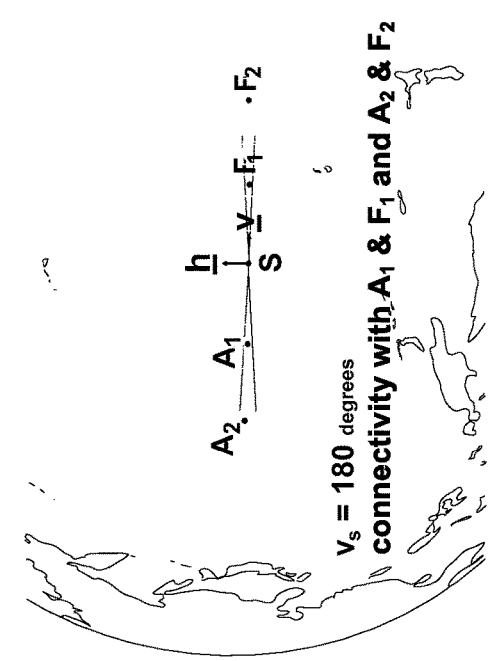

FIG. 18 illustrates the geometry for the orbital mechanics of this constellation configuration. Note that this orbital configuration could be reversed such that to the ascending node of each satellite is offset eastward within each spiral as true anomaly increases. In other words, the successive wraps around the globe could go eastward or westward and accomplish a similar goal.

This orbital architecture is advantageous because it creates a satellite system in which all satellite nodes are connected in a single global string. With this design, every satellite orbits the Earth in its own unique plane in inertial space, and as a result, any message that is passed in the forward direction is also a pass in the westward direction and any message that is passed in the aft direction is also a pass in the eastward direction. This fact means that there is never any need for the satellite network to actively decide whether or not it must pass a message between planes in order to deliver the data payload to the intended recipient on the Earth's surface. Instead, the satellite that is required to downlink the data payload to the recipient is only ever a certain number of passes forward or backward in the satellite network—or a certain number of spirals away.

This also has advantageous implications for ground system requirements. With a globally connected string of satellites, there is no need for various global ground segments to provide connections between satellite orbital planes. Instead one ground station (and perhaps two for back-up/redundancy) is needed, minimally, to connect to all of the satellites in the network to the ground. Of course, in some configurations, there are also satellites that share orbital planes and are used in the manner described herein.

FIG. 19 illustrates the geometry for the forward and aft directions, relative to the reference satellite. Although the forward and aft satellites, in this architecture, are flying in a different inertial plane than the reference satellite (much like the eastward and westward satellites in a typical Walker configuration), the offset in true anomaly is enough that the kidney bean shape of the flight path in the reference frame of the reference satellite is still quite narrow. Redundancy can be provided for in this design as the satellite that is in front of the forward neighboring satellite can fall within the communication cone of a forward-looking high-gain antenna of the reference satellite. Although the distance to this satellite is approximately twice the distance to the forward neighboring satellite relative to the reference satellite, the communication link can still be made to easily close. Trades can be conducted to optimize, depending on the number of satellites in the network, the transmission power and antenna design to manage variability in data rate performance and network throughput. For instance, a phased antenna array might be used where, when the spacecraft in front of the reference satellite fails, the antenna beam can be digitally commanded to point toward the satellite in front of the failed satellite—maintaining the spiral link around the globe for the entire satellite constellation.

In the case of a second failure such that a reference satellite would need to connect to the satellite that is two slots ahead of it in the spiral, RF communication design could be leveraged to also allow for this link to close. If this distance is too far to close a meaningful link, however, in this case, it can be noted that because the system is effectively one long communication chain around the globe, the aft direction can actually serve to service any communications that typically need to be sent in the forward direction. This comes at the cost of increased latency and decreased network throughput, but would at least accomplish the mission of delivery of data without the need of store and forward activities.

The adjacent neighboring satellites do move in the reference frame of a reference satellite, but the movement is small. In the spiral, an aft satellite is aft of the reference satellite and to the side only slightly, and in one orbit it does follow a figure eight, but one with a small angular deviation relative to the reference satellite, well within the beamwidth of the aft antenna of the reference satellite.

Figure 20:
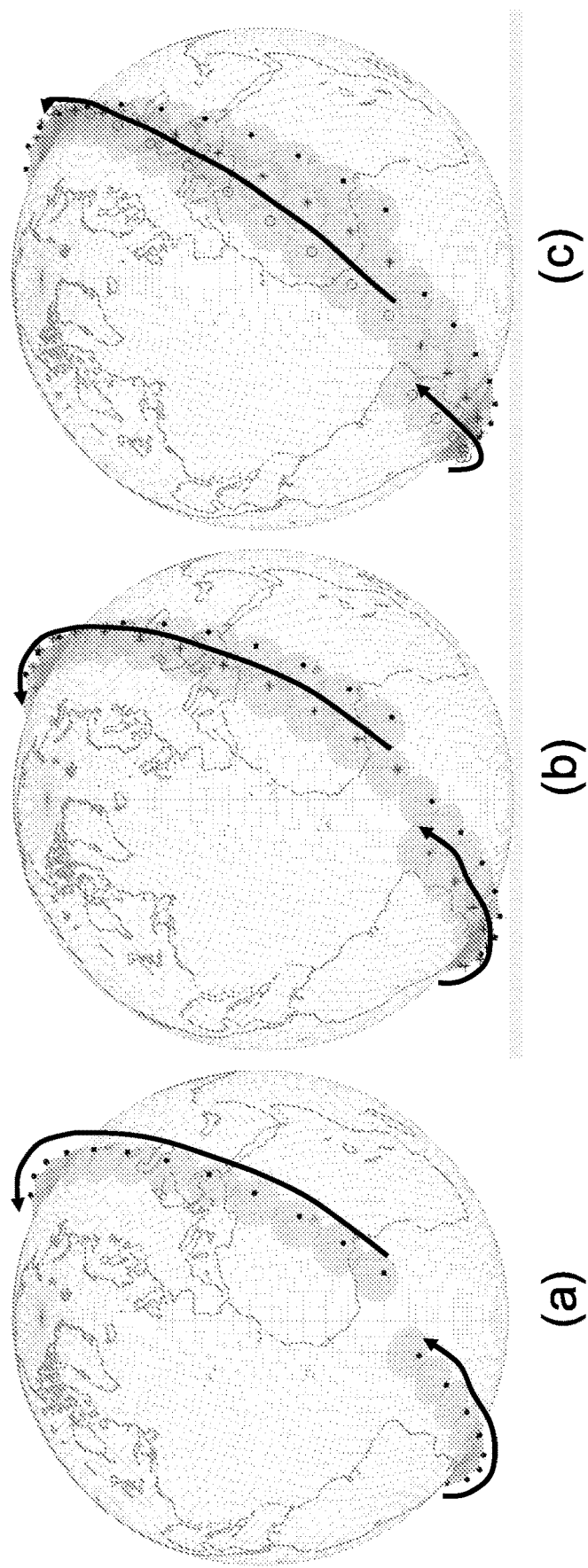
FIG. 20 illustrates a multiple-pass spiral arrangement.

FIG. 20 illustrates a multiple-pass spiral arrangement.

Figure 21:
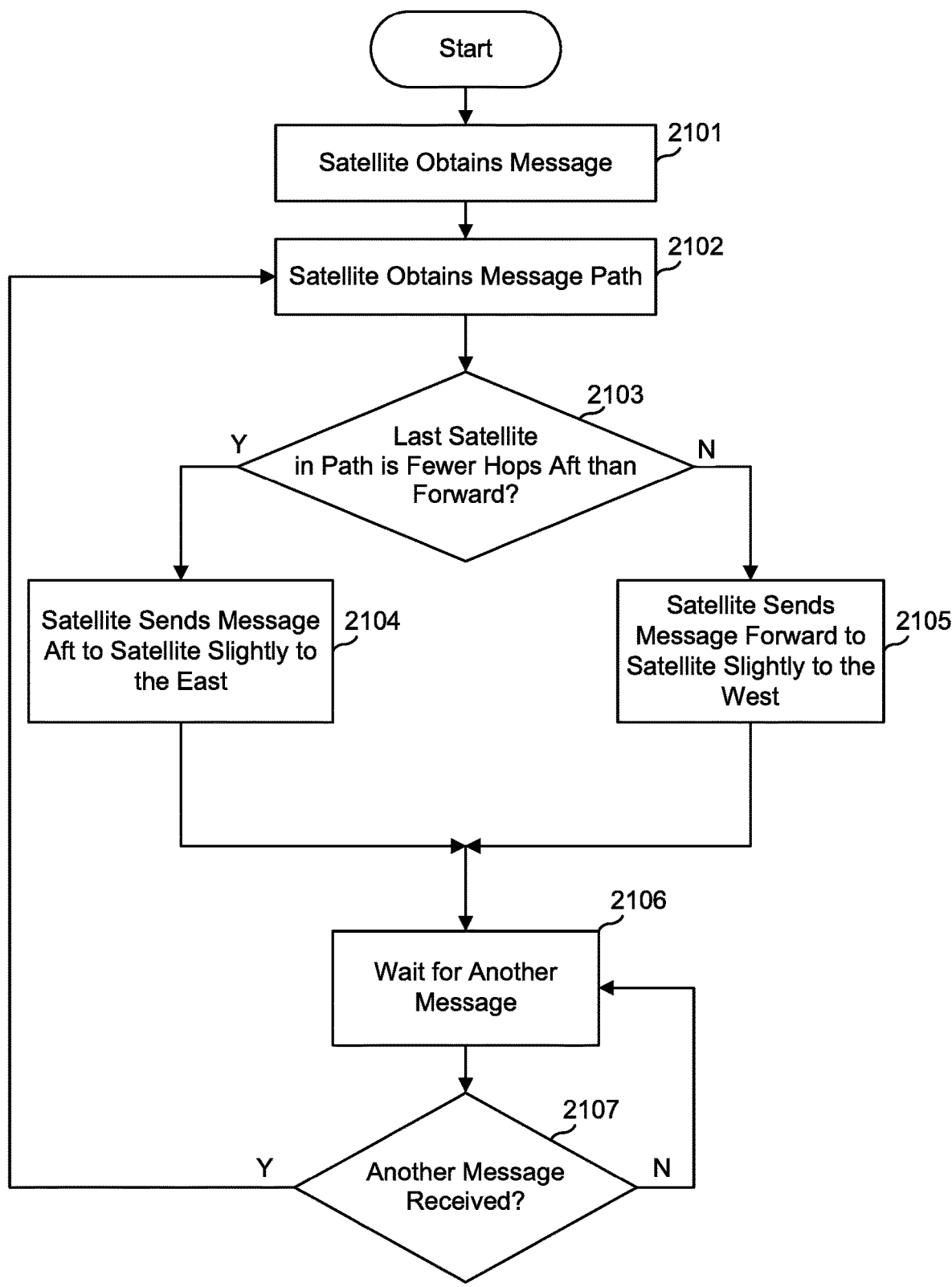
FIG. 21 is a flowchart of a process that might be executed by a satellite in handling messages over such a spiral constellation.

FIG. 21 is a flowchart of a process that might be executed by a satellite in handling messages over such a spiral constellation. In step 2101, the satellite obtains a message, from another satellite or via an uplink from the ground. In step 2102, the satellite obtains a message path. This could be by computing it on-board from a field of the message that indicates the destination, such as global coordinates. A processor in the satellite can compute, knowing current locations of satellites, its own position, and the global coordinates of the destination (which would indicate which satellite in the spiral will do the downlink), to determine a path that needs only forward-looking and aft-looking message passing among satellites. The message path might be obtained by reading it from a message package.

In step 2103, the satellite determines whether the number of links between the current satellite and the downlink satellite is fewer in the aft direction or the forward direction. If the aft path is shorter, in step 2104, the satellite sends the message aft to the next spiral satellite. If the forward path is shorter, in step 2105, the satellite sends the message forward to the next spiral satellite. The satellite then, at step 2106, waits for another message, and/or performs other tasks and then, at step 2107, checks whether another message is received. If so, the process continues at step 2102 with the new message.

It may be that each satellite does not fully compute a message path. Perhaps a satellite need only determine whether it is to send the message in a continued path (i.e., if the satellite received the message at its aft antenna, it transmits it using its forward antenna, and if the satellite received the message at its forward antenna, it transmits it using its aft antenna) or to send it to the ground. The satellite that first receives the message could compute the entire message path for the message and attach that to the message. That path might not need to be fully specified, other than to indicate which satellite in the spiral is to send the message in a downlink.

In one variation, the computation that determines a message path, be it on the ground, on one satellite, or in multiple places, takes into account the possibility of "wormholes" in the spiral, wherein a satellite (or other path determiner) determines that it is better to send the message to a ground station that can uplink the message to another location in the spiral. For example, if a ground station is within the footprint of a first satellite and also within the footprint of a second satellite that is 60 links away from the first satellite, the first satellite sends the message to the ground, it gets picked up by the ground station and uplinked to the second satellite, possibly speeding up the delivery of the message. In another variation, the ground station getting the downlink is separated geographically from a second ground station that does the uplink and neither needs to be in both satellites' footprints at the same time.

Figure 22:
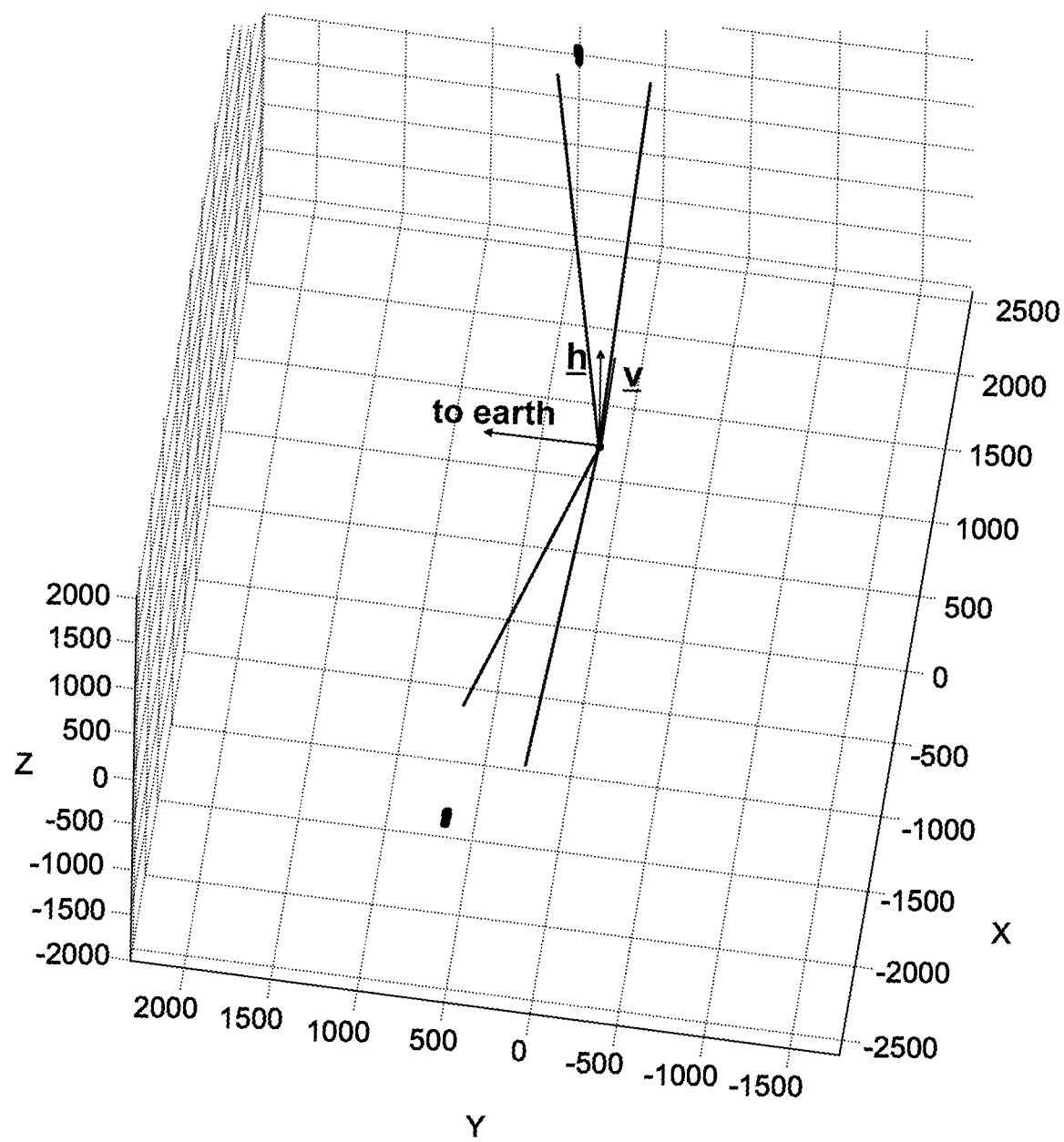
FIG. 22 is an illustration of an arrangement of spiral satellites.

FIG. 22 is an illustration of an arrangement of spiral satellites. As illustrated there, a forward beam, in the v vector direction, from a forward antenna would cover a forward neighboring satellite in the spiral throughout its orbit, and similarly for an aft neighboring satellite. In fact, as shown, the next neighboring aft and forward antennas are also within the beams.

Benefits of the herein-described embodiments can include a decrease in technical complexity, cost, mass, and power requirements for a spacecraft in a satellite network required to maintain connectivity between every satellite in the network and the ground at any point in time. By effectively creating a continuous, yet operationally and technically simple, communication string of connectivity among every node in the satellite network, there are powerful implications for inexpensively delivering global knowledge throughout the space segment and globally dispersed ground nodes (devices, systems, users, etc.). Costs of a space segment might be reduced by a factor of two to three when considering the savings to the mass, power, and link budget and how those savings propagate through design, integration, test, launch, and operations, etc. Further operational and financial benefit might be had via the elimination of the need for as many ground station for network operations and TT&C. As a result, the cost associated with the ground system portion of a satellite network, when using the teaching herein, could be reduced by an order of magnitude or greater.

As has now been described, in a novel approach, message paths (which might be a listing of links a message is to take, and possibly the time the message is to travel over those links) are computed and assigned not necessarily to the shortest path, but along a message path that follows satellites in a constellation along an orbital plane until a point where another orbital plane intersects the first orbital plane, at which time a satellite can use its forward or aft antenna to transmit to another satellite that, while being at that time in front or behind the sending satellite, is actually in a different orbital plane. This allows for inter-satellite links to occur without requiring the use of side antennae or wide-lobe antennae. This can be done without unworkable latencies, even considering signal transmission times, as there is a calculable maximum time-of-flight of a message. In one example, a satellite forwards data to a forward satellite, that in turn sends the data forward, until the orbital planes intersect, and then the satellites either send the data forward on the new orbital plane or aft, depending on which is the closest route to a satellite that has a footprint that covers the destination device.

In a variation of the novel approach, each satellite travels in its own orbital plane and other satellites in the constellation travel in orbital planes that cross. In such an arrangement, transmissions can head in one direction, as in a spiral, each time changing orbital plane slightly. While this might involve a data transmission circumnavigating the Earth more than once, the resulting latency of around 140 milliseconds per circumnavigation can be acceptable. With the use of strategically placed ground repeater stations, a message can jump from one part of the spiral to another.

The novel techniques can be used in combination with existing techniques, where suitable. In one implementation, satellites might be configured to use some techniques, including conventional techniques, until sufficient satellites fill out the constellation and the novel techniques are implemented.

In the computer process for determining a message path, this might be done at one place by inputting a source location, a transmission time, a destination location, and other parameters, and then have the message path included with the source message, so that each receiving satellite knows how to route each data transmission. Such a satellite would be programmed to direct a transmission after reading a message path data field from a transmission where the message path data field was computing according to a novel method described herein. Alternatively, a satellite can be programmed to compute the message path, or a portion thereof, having a transmission time, a destination location, and other parameters, and use that to determine how to route a data transmission. Where the message path includes timing targets, a satellite might hold a message for delayed transmission, so as to meet those timing targets. The timing targets might be used to provide closer alignment of cross-plane satellites or to account for dynamic satellite footprints.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of operating a communications system to transfer messages from a source device to a destination device, the method comprising:
    obtaining, at a first satellite that is orbiting in a first orbital plane, a message;
    obtaining, at the first satellite, a message path for the message, wherein the message path accounts for orbital movements of the first satellite and other satellites in a constellation;
    determining, based on the message path, a next satellite in the constellation selected from an aft satellite, a forward satellite, a west-crossing cross-plane satellite, or an east-crossing cross-plane satellite;
    storing the message at the first satellite for a predetermined period of time prior to sending the message to the next satellite, wherein the predetermined period of time is determined from orbital parameters and corresponds to a passing of a cross-plane satellite in a beam path of the first satellite; and
    sending, from the first satellite, the message to the next satellite, wherein the west-crossing cross-plane satellite or the east-crossing cross-plane satellite is selected for at least one message and is selected based on when the cross-plane satellite passes in the beam path of the first satellite.

2. The method of claim 1, wherein obtaining the message path comprises computing it on the first satellite.

3. The method of claim 1, wherein obtaining the message path comprises computing it at a ground location, the method further comprising including a representation of the message path with the message.

4. The method of claim 1, further comprising:
    passing the message from a downlink satellite to a ground station; and
    passing the message from the ground station to an uplink satellite, if the message path includes the ground station.

5. The method of claim 1, wherein the predetermined period of time is specified in a representation of the message path.

6. The method of claim 1, wherein each satellite in the constellation has a distinct orbital plane and the constellation is arranged as a spiral.

7. The method of claim 1, wherein the message path contains links between for cross-plane satellites when an in-plane antenna can be used to convey the message.

8. A system for communicating messages from a source device to a destination device comprising:
    a processor for computing a message path for a message;
    a plurality of satellites in a constellation, wherein a first satellite of the plurality of satellites orbiting in a first orbital plane is configured to receive and send messages to other satellites in the constellation;
    first storage for the message path for the message, wherein the message path accounts for orbital movements of the first satellite and other satellites in the constellation;
    a first antenna for sending and receiving messages between the first satellite and an aft in-plane satellite or an aft cross-plane satellite;
    a second antenna for sending and receiving messages between the first satellite and a forward in-plane satellite or a forward cross-plane satellite;
    second storage for storing messages at the first satellite for a predetermined period of time prior to sending the message to a cross-plane satellite, the cross-plane satellite being the aft cross-plane satellite or the forward cross-plane satellite, wherein the predetermined period of time is determined from orbital parameters and corresponds to a passing of the cross-plane satellite in a beam path of the first satellite;
    logic for determining based on the message path, a next satellite in the constellation selected from the aft in-plane satellite, the forward in-plane satellite, the aft cross-plane satellite, or the forward cross-plane satellite; and
    radio frequency transmission system for sending or receiving, to or from the first satellite, the message from or to the next satellite, based on the message path, wherein the cross-plane satellite is selected for at least one message and is selected based on when the cross-plane satellite is passing in the beam path of the first satellite.

9. The system of claim 8 further comprising program code memory.

10. The system of claim 8, wherein obtaining the message path comprises computing it at a ground location and including a representation of the message path with the message.

11. The system of claim 8, further comprising:

passing the message from a downlink satellite to a ground station; and passing the message from the ground station to an uplink satellite, if the message path includes the ground station.

12. The system of claim 8, further comprising:

a clock for use at least in timing storage of messages as indicated by representations of predetermined periods specified by or determined from the message path.

13. The system of claim 12, wherein a representation of the predetermined period of time is specified in a representation of the message path.

14. The system of claim 8, wherein each satellite in the constellation has a distinct orbital plane and the constellation is arranged as a spiral.

15. The system of claim 8, wherein the message comprises a representation of an SMS message, a data packet, or at least a portion of a digitized audio signal.

16. The system of claim 15, wherein the digitized audio signal comprises a voice signal.

17. A satellite, for use in a constellation of satellites capable of inter-satellite message forwarding and having orbital planes comprising:

a processor;

first memory storage for a message;

second memory storage for a representation of at least a portion of a message path indicating a plurality of satellites in the constellation through which the message is to be forwarded;

an aft antenna for sending and receiving messages between the satellite and an aft in-plane satellite or an aft cross-plane satellite;

a forward antenna for sending and receiving messages between the satellite and a forward in-plane satellite or a forward cross-plane satellite;

program code storage for storing program code for determining based on the message path, which of the satellites in the constellation is to be a next satellite, the next satellite selected from the aft in-plane satellite, the forward in-plane satellite, the aft cross-plane satellite, or the forward cross-plane satellite, where the determination considers orbital plane crossings, wherein the message is stored in the first memory storage for a predetermined period of time prior to the message being sent to a cross-plane satellite, the cross-plane satellite being the aft cross-plane satellite or the forward cross-plane satellite, wherein the predetermined period of time is determined from orbital parameters and corresponds to a passing of the cross-plane satellite in a beam path of the satellite, and wherein the cross-plane satellite is selected for at least one message and is selected based on when the cross-plane satellite is passing in the beam path of the satellite.

* * * * *